United States Patent
Tsutsui et al.

(10) Patent No.: US 11,871,074 B2
(45) Date of Patent: Jan. 9, 2024

(54) COMMUNICATION SYSTEM, DISPLAY CONTROL DEVICE, COMMUNICATION TERMINAL, AND COMPUTER-READABLE STORAGE MEDIUM ALLOWING SUPPLEMENTAL DOWNLINK WITH A LARGE CAPACITY UTILIZING OPTICAL COMMUNICATION

(71) Applicant: SoftBank Corp., Tokyo (JP)

(72) Inventors: Takashi Tsutsui, Tokyo (JP); Ayumu Yabuki, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 17/985,162

(22) Filed: Nov. 11, 2022

(65) Prior Publication Data

US 2023/0071454 A1   Mar. 9, 2023

Related U.S. Application Data

(60) Division of application No. 16/941,575, filed on Jul. 29, 2020, now Pat. No. 11,546,655, which is a
(Continued)

(51) Int. Cl.
*H04N 21/4363* (2011.01)
*H04N 21/431* (2011.01)
(Continued)

(52) U.S. Cl.
CPC ..... *H04N 21/43637* (2013.01); *H04B 7/0456* (2013.01); *H04N 21/4316* (2013.01); *H04N 21/43635* (2013.01); *H04W 72/23* (2023.01)

(58) Field of Classification Search
CPC ......... H04N 21/43637; H04N 21/4316; H04N 21/43635; H04N 9/3179; H04N 9/3194;
(Continued)

(56) References Cited

U.S. PATENT DOCUMENTS

| 6,850,252 B1 | 2/2005 | Hoffberg |
| 2003/0058262 A1* | 3/2003 | Sato ........................ G06F 3/147 345/691 |

(Continued)

FOREIGN PATENT DOCUMENTS

| CN | 101420592 A | 4/2009 |
| CN | 103024352 A | 4/2013 |

(Continued)

OTHER PUBLICATIONS (ISA/237) Written Opinion of the International Search Authority for International Patent Application No. PCT/JP2018/003220, issued/mailed by the Japan Patent Office dated Apr. 24, 2018.
(Continued)

*Primary Examiner* — Alazar Tilahun

(57) ABSTRACT

In accordance with increasing communication demand, means for efficiently providing mass downstream communication at a low cost are desired. Accordingly, a communication system providing supplemental downlink as well as multicast communication comprising a display control device for causing a display unit to display a video, and a communication terminal having an image capturing unit for directly capturing the video displayed by the display unit or capturing a video projected or reflected on a wall surface or the like is provided, wherein the display control device includes a video acquiring unit, a region identification unit, a video generating unit, and a display control unit, and the communication terminal includes a region identification unit, a decoding unit, and a mechanism for communicating a control signal for supplemental downlink by the above-described optical communication using means other than optical communication (means such as WiFi, mobile data communication or the like).

5 Claims, 40 Drawing Sheets

Related U.S. Application Data continuation of application No. PCT/JP2018/003220, filed on Jan. 31, 2018.

(51) Int. Cl.
*H04B 7/0456* (2017.01)
*H04W 72/04* (2023.01)
*H04W 72/23* (2023.01)

(58) Field of Classification Search
CPC ........... H04N 21/4122; H04N 21/4126; H04N 21/4223; H04N 21/4622; H04N 21/4312; H04B 7/0456; H04B 10/116; H04W 72/042

See application file for complete search history.

(56) References Cited

U.S. PATENT DOCUMENTS

| | | | |
|---|---|---|---|
| 2008/0092154 A1* | 4/2008 | Hogyoku | H04N 21/4753 348/E7.055 |
| 2008/0267298 A1 | 10/2008 | Morimoto | |
| 2011/0169919 A1* | 7/2011 | Karaoguz | H04N 21/235 348/46 |
| 2012/0236210 A1* | 9/2012 | Matsubayashi | H04N 21/4312 348/739 |
| 2014/0204129 A1 | 7/2014 | Oshima | |
| 2014/0205136 A1* | 7/2014 | Oshima | H04N 3/00 382/100 |
| 2014/0240708 A1 | 8/2014 | Matsushita | |
| 2015/0023673 A1 | 1/2015 | Kaneko | |
| 2016/0112125 A1* | 4/2016 | Yokoi | H04B 10/116 398/118 |

FOREIGN PATENT DOCUMENTS

| | | |
|---|---|---|
| CN | 104006880 A | 8/2014 |
| CN | 105187910 A | 12/2015 |
| JP | 2001345958 A | 12/2001 |
| JP | 2004326705 A | 11/2004 |
| JP | 2007228618 A | 9/2007 |
| JP | 2007295490 A | 11/2007 |
| JP | 2008301478 A | 12/2008 |
| JP | 2013009074 A | 1/2013 |
| JP | 2015158596 A | 9/2015 |
| JP | 2016082425 A | 5/2016 |
| JP | 6250913 B1 | 12/2017 |
| TW | 200518570 A | 6/2005 |
| WO | 2014103329 A1 | 7/2014 |
| WO | 2014103333 A1 | 7/2014 |

OTHER PUBLICATIONS

Those references were submitted as IDS or found by the examiner over the earlier U.S. Appl. No. 16/941,575, filed Jul. 29, 2020.

Office Action issued for counterpart Chinese Application 201880088271.3, issued by The State Intellectual Property Office of People's Republic of China dated Feb. 15, 2023.

Yuan Hui-Juan et al., The image processing of 3D measurement based on color-encode, Journal of Natural Science of Heilongjiang University. Aug. 2009 vol. 26 No. 4 p. 533-537, retrieved from the Internet: URL:http://www.hldz.chinajournal.net.cn/WKE/WebPublication/paperDigest.aspx?paperID=c425c90f-e72c-45a9-9f65-2fd42d32686e.

\* cited by examiner

COMMUNICATION SYSTEM, DISPLAY CONTROL DEVICE, COMMUNICATION TERMINAL, AND COMPUTER-READABLE STORAGE MEDIUM ALLOWING SUPPLEMENTAL DOWNLINK WITH A LARGE CAPACITY UTILIZING OPTICAL COMMUNICATION

This application is a divisional of U.S. patent application Ser. No. 16/941,575, filed on Jul. 29, 2020, which is a continuation of International Patent Application No. PCT/JP2018/003220, filed on Jan. 31, 2018, the entire contents of both of which are explicitly incorporated herein by reference.

BACKGROUND

1. Technical Field

The present invention relates to a communication system, a display control device, a communication terminal, and a computer-readable storage medium.

2. Related Art

A visible-light communication technology has been known that encodes transmission data into displayed images by image display devices (See, for example, Patent Document 1).

PRIOR ART DOCUMENTS

Patent Document

[Patent Document 1] International Publication No. WO2014/103329

Technical Problem

Optical downstream communication is achieved and supplemental downlink of a terminal or the like is achieved to enable efficient high-speed communication, by using a camera attached to a terminal or the like as a receiver, and using a display device or a projector installed indoor or outdoor, a projector or digital signage for projection mapping, or a device redefined as a lighting equipment or the like utilizing the above (a panel of a ceiling standard using a display device as a lighting equipment, used in the present invention as a supplemental downlink as well as a lighting panel) as a transmitter.

Though PureLiFi has been attempting to achieve ultra high-speed gigabit communication using an overcapacity high-speed laser, without such effort, since a number of pixels are mounted on normal display panels and normal CCDs, a communication rate exceeding gigabits can be achieved without developing new devices, and moving images can be displayed and captured with sufficient efficiency. In displays and cameras with USB 3.1, transfer speed of 10 Gbps is readily achieved. The present invention has an advantage in that existing devices as described above can be used as it is without using expensive devices or advanced technologies. Unlike space division multiple access (SDMA) that has been used in communication systems, LOS (Line of sight) cross each other in space to achieve multiplexing. The present invention also has an advantage in that multiplexing is achieved freely.

General Disclosure

According to a first aspect of the present invention, a communication system is provided, including a display control device for causing a display unit to display a video, and a communication terminal having an image capturing unit for capturing the video displayed on the display unit. The display control device may include a video acquiring unit for acquiring a video to be displayed. The display control device may include a region identification unit for identifying, within the video acquired by the video acquiring unit, a region having no change or a region having an amount of change that is lower than a predetermined threshold. The display control device may include a video generating unit for generating an encoded video obtained by encoding, as an optical communication signal, transmission data into a region identified by the region identification unit. The display control device may include a display control unit for causing the display unit to display the encoded video. The communication terminal may include a region identification unit for identifying, within the video captured by the image capturing unit, a region into which the transmission data is encoded. The communication terminal may include a decoding unit for decoding the transmission data from the region identified by the region identification unit.

The above-described image capturing unit can record a video at a specified rate. Capturing may be of a moving image of 60 fps, for example, instead of a static image. The recording rate of the image capturing unit and the displaying rate of the display unit may be synchronized. In a system in which synchronization is assumed, when there is a gap in synchronization, a striped patter (noise) is recorded as in case when recording a television with a camera and an error occurs at the time of decoding. In addition, the video projecting device and the video acquiring unit desirably synchronize at alternating current at each location and acquire a video at zero cross timing. (at 100 Hz if 50 Hz, and at 120 Hz if 60 Hz).

The above-described region identification unit may identify a region in which, for a predetermined period, brightness and color information do not change or an amount of change is lower than a predetermined threshold, within the above-described video acquired by the above-described video acquiring unit. The above-described video generating unit may generate the above-described encoded video obtained by encoding, as an optical communication signal, region information indicating a region into which the above-described transmission data is encoded, into a region other than a region into which the above-described transmission data is encoded, and the above-described region identification unit may identify a region into which the region information is encoded, within a video captured by the above-described image capturing unit to decode the above-described region information from the above-described region, and identifies a region indicated by the above-described region information as a region into which the above-described transmission data is encoded. The above-described video generating unit may generate the above-described encoded video obtained by encoding terminal identification information for identifying the above-described communication terminal as an optical communication signal in a region other than a region into which the above-described transmission data is encoded. The above-described video generating unit may generate the above-described encoded video obtained by encoding, as an optical communication signal, display device identification information for identifying the above-described display device into a region other than a region into which the above-described transmission data is encoded.

The above-described communication terminal may include a measuring unit for measuring a reception brightness level and reception SNR (Signal to Noise Ratio) of the above-described video captured by the above-described image capturing unit and a measurement result transmission unit for transmitting a measurement result by the above-described measuring unit to the above-described display control device, and the above-described display control device may include a measurement result reception unit for receiving the above-described measurement result and a brightness level adjusting unit for adjusting the brightness level of a display by the above-described display unit, based on the above-described measurement result. The above-described video acquiring unit may acquire a screensaver video by the above-described display unit, the above-described video generating unit may generate an encoded video obtained by encoding transmission data in an identified region of the above-described screensaver video, the above-described display control unit may cause the above-described display unit to display the above-described encoded video as a screensaver, and the above-described measuring unit may measure the above-described reception brightness level and the above-described reception SNR based on the transmission data decoded by the above-described decoding unit. The above-described measurement result transmission unit may transmit the above-described measurement result to the above-described display control device without using optical communication.

The above-described communication terminal may include a capture conversion unit for performing affine transformation on a displayed video by the above-described display control unit to convert the displayed video into a square, and a directionality adjusting unit for adjusting directionality of capturing by the above-described image capturing unit based on the information at the time of the above-described conversion. The above-described display control device may include an information reception unit for receiving, from the above-described communication terminal, captured video information related to a video captured by the above-described image capturing unit, and the above-described video generating unit may generate the above-described encoded video based on the above-described captured video information. The above-described video generating unit may change the number of pixels to which each piece of information of the above-described transmission data is allocated, based on the above-described captured video information. The above-described captured video information may indicate a region that cannot be captured by the above-described image capturing unit, within a video displayed on the above-described display unit, and the above-described video generating unit may generate an encoded video obtained by encoding, as an optical communication signal, transmission data into a region excluding a region that cannot be captured by the above-described image capturing unit, from a region identified by the above-described region identification unit.

The above-described display unit may be a projector, and the above-described image capturing unit may capture light projected onto a projection surface by the above-described projector. The above-described video generating unit may generate an encoded video obtained by encoding, as an optical communication signal, transmission data into a video in which the contents do not change. The above-described communication terminal may include a notification data sending unit for transmitting notification data to the above-described display control device when the above-described video cannot be captured by the above-described image capturing unit, and the above-described video generating unit may generate an encoded video obtained by encoding, as an optical communication signal, the above-described transmission data by means of brightness modulation of the entire above-described video, when the above-described notification data is received. The above-described display control device may include a CPRI (Common Public Radio Interface) interface for transmitting a signal obtained by converting the above-described transmission data to an IQ vector signal with a baseband device of a wireless base station from the above-described baseband device, an interface for transferring a video signal to the above-described display unit (HDMI (registered trademark)(High-Definition Multimedia Interface) or the like), and a circuit for converting an IQ signal (a baseband signal formed of in-phase and quadrature components of a complex digital signal) on the above-described CPRI interface to an RGBI signal and transmitting it. The baseband device of the above-described wireless base station may include a function to convert a CPRI signal to a HDMI (registered trademark) and transmit it, and the above-described display control device may transmit the IQ signal from the above-described baseband device from the HDMI (registered trademark) interface.

In case where the baseband device of the above-described wireless base station does not include an HDMI interface, there may be a device for converting a CPRI signal to HDMI (registered trademark) between the above-described baseband device and the above-described display control device.

According to a second aspect of the present invention, a display control device is provided. The display control device may include a video acquiring unit for acquiring a video to be displayed. The display control device may include a region identification unit for identifying, within the video acquired by the video acquiring unit, a region having no change or a region having an amount of change that is lower than a predetermined threshold. The display control device may include a video generating unit for generating an encoded video obtained by encoding, as an optical communication signal, transmission data into a region identified by the region identification unit. The display control device may include a display control unit for causing the display unit to display the encoded video.

According to a third aspect of the present invention, a non-transitory computer-readable storage medium having stored thereon a program that causes a computer to function as the above-described display control device is provided.

According to a fourth aspect of the present invention, a communication terminal is provided. The communication terminal may include a region information acquiring unit for acquiring region information indicating a region into which transmission data is encoded as an optical communication signal, within a video displayed on a display device. The communication terminal may include a region identification unit for identifying, based on region information, a region into which transmission data is encoded, within a video captured by the image capturing unit. The communication terminal may include a decoding unit for decoding transmission data from the region identified by the region identification unit.

According to a fifth aspect of the present invention, a non-transitory computer-readable storage medium having stored thereon a program for causing a computer to function as the above-described communication terminal is provided.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through the embodiments of the invention, but the following embodiments do not limit the invention according to the claims. In addition, not all of the combinations of features described in the embodiments are essential to the solving means of the invention.

Figure 1:
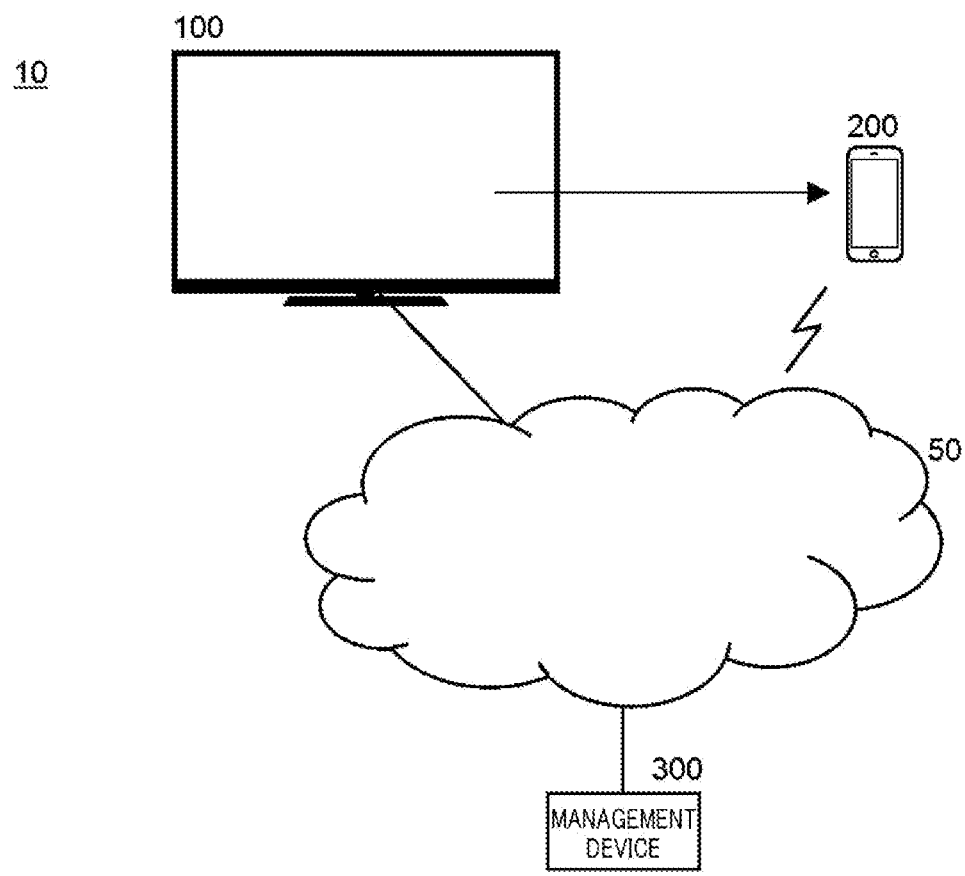
FIG. 1 schematically illustrates an example of a communication system 10.

FIG. 1 schematically illustrates an example of a communication system 10. The communication system 10 includes a display device 100 and a communication terminal 200.

The display device 100 and the communication terminal 200 execute the so-called optical communication. For example, the display device 100 generates and displays encoded videos obtained by encoding transmission data as optical communication signals to the videos to be displayed, and the communication terminal 200 captures the videos displayed by the display device 100 and decodes the optical communication signal to acquire transmission data. Examples of an optical communication system utilized by the communication system 10 include methods by brightness modulation or RGB modulation. However, the optical communication system is not limited thereto, and may use any methods.

The video displayed by the display device 100 may be any video, and the display device 100 may be any display device. Examples of the display device 100 include a television, a display of a PC (Personal Computer) or the like, digital signage, and the like. In addition, examples of the display device 100 include a lighting device that is capable of displaying videos, of which the main purpose is to provide lighting.

The display device 100 may be an example of the display control device. The entire display device 100 may be an example of the display control device. In addition, a portion of the display device 100 may be an example of the display control device. For example, a portion other than the display unit in the display device 100 may be an example of the display control device. As a specific example, a module, a chip, and the like in the display device 100 may be an example of the display control device.

The communication terminal 200 may be any kind of terminal as long as it has an image capturing unit and a communication function. Examples of the communication terminal 200 include a smartphone, a tablet terminal, an HMD (Head Mount Display), and the like.

The display device 100 according to the present embodiment, for example, identifies a region in which, for a predetermined period, the brightness and color information do not change or the amount of change is lower than a predetermined threshold or the like, within the videos to be displayed, and generates and displays an encoded video obtained by encoding transmission data as a optical communication signal into the identified region.

In this way, by encoding transmission data in a region in which, for a predetermined period, the brightness and color information do not change or the amount of change is lower than a predetermined threshold, within the video, communication throughput can be improved compared to conventional optical communication using a display device. In conventional optical communication, since transmission data is merely encoded for the displayed video, the spatial resolution is low and sufficient throughput cannot be obtained. Therefore, only transmission data with small volume such as a URL can be transmitted. On the other hand, with the display device 100 according to the present embodiment, since a region having less amount of change in information entropy, within the video, is spatially divided and used, an efficient and sufficiently rapid throughput can be obtained.

In addition, in the communication system 10 according to the present embodiment, a so-called communication control between the display device 100 and the communication terminal 200 may be achieved by communication via a network 50. In such cases, the display device 100 and the communication terminal 200 may communicate with the management device 300 via the network 50.

The network 50 may be any network, and a communication system via the network 50 can be exemplified as, for example, mobile communication systems such as 3G ($3^{rd}$ Generation) communication system, LTE (Long Term Evolution) communication system, 4G ($4^{th}$ Generation) communication system, 5G ($5^{th}$ Generation) communication system, as well as internet communication technologies including WiFi (registered trademark), ADSL, cable modem and the like, LPWA (including LoRa, NB-IoT, eMTC) or the like.

In the communication system 10, the communication terminal 200, for example, transmits terminal identification information for identifying itself to the display device 100 via a management device 300, and the display device 100 displays an encoded video encoded using said identification information with the transmission data. The communication terminal 200 can execute optical communication only between the display device 100 and a particular communication terminal 200 by decoding the transmission data using terminal identification information it owns, and can achieve unicast service that was unachievable with conventional optical communication.

Figure 2:
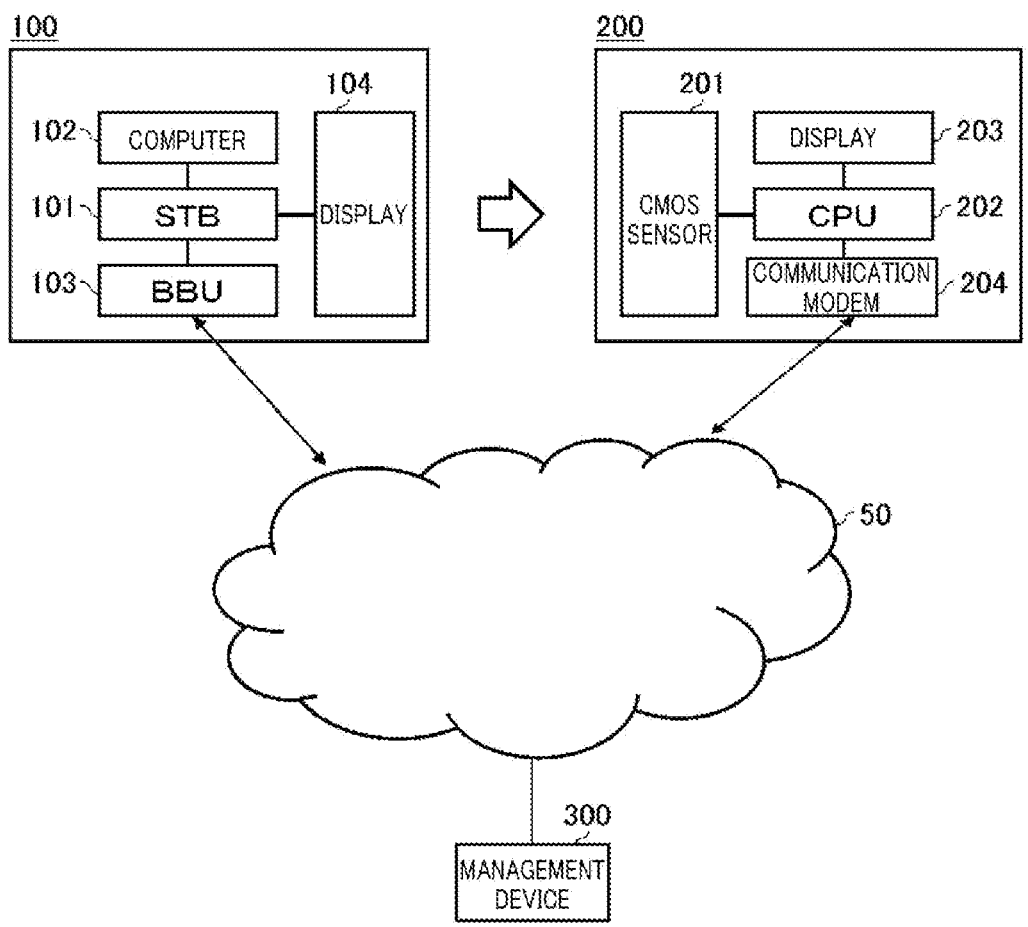
FIG. 2 schematically illustrates a configuration example of a display device 100 and a communication terminal 200.

FIG. 2 schematically illustrates a configuration example of a display device 100 and a communication terminal 200 shown in FIG. 1. In the example shown in FIG. 2, the display device 100 includes an STB (Set Top Box) 101, a computer 102, a BBU (Base Band Unit) 103, and a display 104. In addition, the communication terminal 200 includes a CMOS (Complementary MOS) sensor 201, a CPU 202, a display 203, and a communication modem 204.

The STB 101 acquires a video to be displayed from the computer 102. In addition, the STB 101 acquires transmission data from the BBU 103. The BBU 103 may, for example, receive, from any terminal or the like via the network 50, transmission data to be transmitted from the display device 100 to the communication terminal 200, and transmit the transmission data to the STB 101.

The STB 101 identifies a region in which, for a predetermined period, the brightness and color information do not change or the amount of change is lower than a predetermined threshold, within the video acquired from the computer 102. The STB 101 then encodes region information indicating the region of the transmission data as the optical communication signal in a region within the identified region, and generates an encoded video obtained by encoding the transmission data acquired from the BBU 103 as optical communication signal in the region indicated by the region information described above and causes the display 104 to display the encoded video.

The CMOS sensor 201 captures a video displayed on the display 104. The CPU 202 acquires the video from the CMOS sensor 201, separates said video into video data and communication decoding video, and transmits the video data to the display 203 and the communication decoding video to the communication modem 204. The display 203 displays the video data. The communication modem 204 decodes the encoded region information, and decodes the transmission data using said region information.

Figure 3:
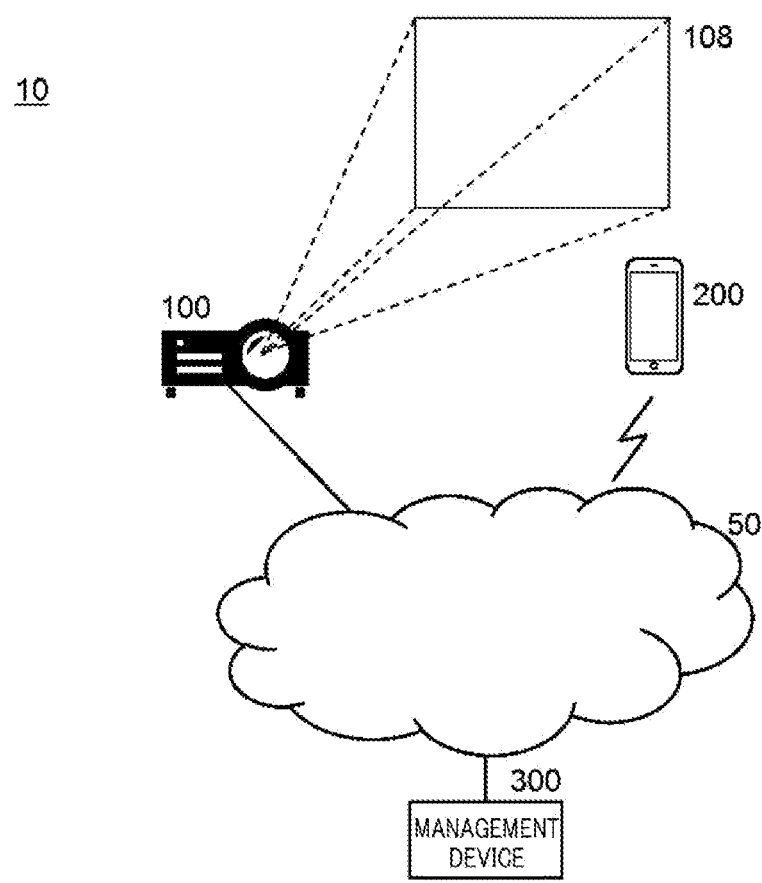
FIG. 3 schematically illustrates another example of the communication system 10.

FIG. 3 schematically illustrates another example of the communication system 10. Here, the difference with FIG. 1 will be mainly described.

The display device 100 in FIG. 3 projects a video. The video projected by the display device 100 is described as a projected video 108. The video displayed by the display device 100 may be any video or invisible video by infrared ray, and the display device 100 may be any display device. Examples of a display device 100 include a projector, a projection mapping, digital signage, and the like. In addition, examples of the display device 100 include a lighting device that is capable of displaying videos, of which the main purpose is to provide lighting.

Figure 4:
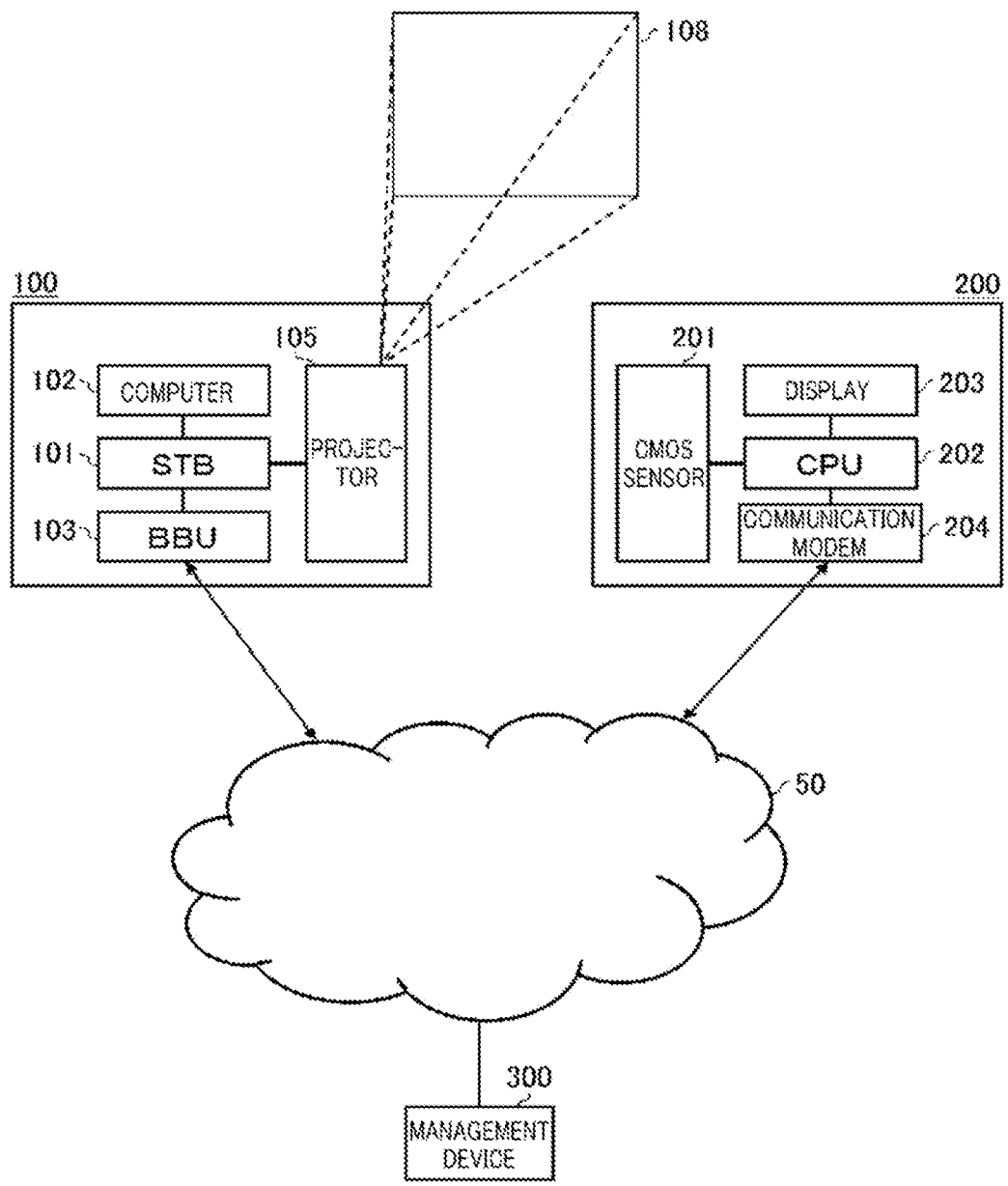
FIG. 4 schematically illustrates a configuration example of the display device 100 and the communication terminal 200.

FIG. 4 schematically illustrates a configuration example of the display device 100 and the communication terminal 200 shown in FIG. 3. Here, the difference with FIG. 2 will be mainly described.

In the example shown in FIG. 4, the display device 100 includes a STB 101, a computer 102, a BBU 103, and a projector 105. The STB 101 acquires a video to be displayed from the computer 102. In addition, the STB 101 acquires transmission data from the BBU 103.

The STB 101 identifies a region in which, for a predetermined period, the brightness and color information do not change or the amount of change is lower than a predetermined threshold, within the video acquired from the computer 102. The STB 101 then encodes region information indicating the identified region as the optical communication signal in a region within the identified region, and generates an encoded video obtained by encoding the transmission data acquired from the BBU 103 as optical communication signal in the identified region and causes the projector 105 to display it.

The CMOS sensor 201 captures the projected video 108 projected by the projector 105. The target onto which the video is to be projected may be any location, and the video may be, for example, projected onto a wall of a building or the like. The CPU 202 acquires the video from the CMOS sensor 201, separates said video into video data and communication decoding video, and transmits the video data to the display 203 and the communication decoding video to the communication modem 204. The display 203 displays the video data. The communication modem 204 decodes the encoded region information, and decodes the transmission data using said region information. It is mainly at nighttime that the projector 105 becomes effective.

Figure 5:
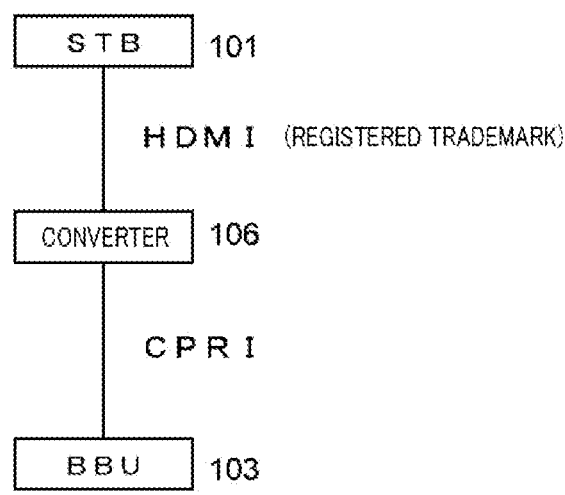
FIG. 5 schematically illustrates a connection relation between STB 101 and BBU 103.

FIG. 5 schematically illustrates a connection relation between the STB 101 and the BBU 103. The STB 101 and the BBU 103 are connected via a converter 106. The STB 101 and the converter 106 communicate via HDMI. The converter 106 and the BBU 103 communicate via CPRI.

Figure 6:
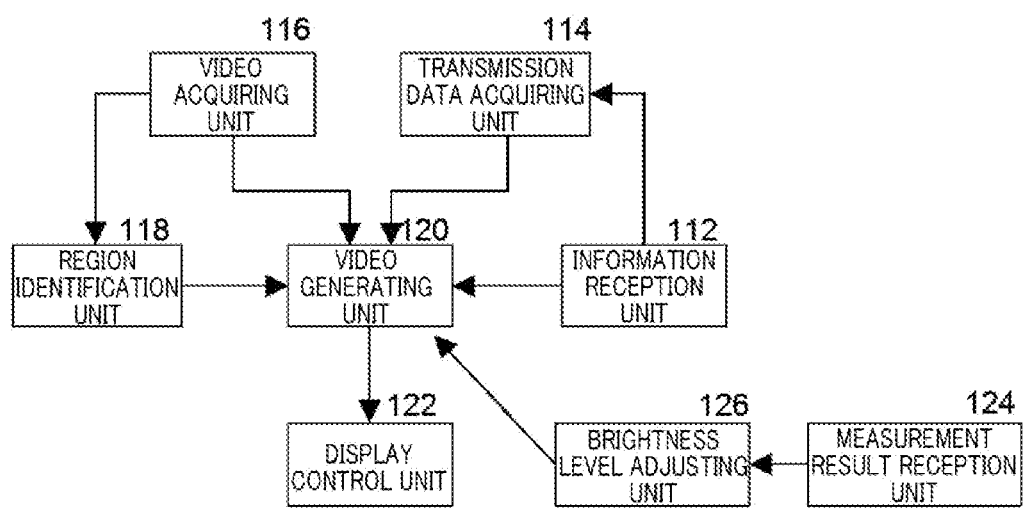
FIG. 6 schematically illustrates an example of functional configuration of the display device 100.

FIG. 6 schematically illustrates an example of functional configuration of the display device 100. The display device 100 includes an information reception unit 112, a transmission data acquiring unit 114, a video acquiring unit 116, a region identification unit 118, a video generating unit 120, a display control unit 122, a measurement result reception unit 124, and a brightness level adjusting unit 126. Note that, the display device 100 does not necessarily include all of these components.

The information reception unit 112 receives each type of information. The information reception unit 112 may receive information via a network 50. The information reception unit 112 receives, from the management device 300 via the network 50, information related to communication control, for example. The information reception unit 112 receives, from the management device 300, terminal identification information for identifying the communication terminal 200 that is the communication partner, for example. In addition, the information reception unit 112 receives, via the network 50, transmission data to be transmitted to the communication terminal 200, for example.

The display device 100 may notify the communication terminal 200 of the terminal identification information through optical communication.

The transmission data acquiring unit 114 acquires transmission data to be transmitted to the communication terminal 200. The transmission data acquiring unit 114 may read the transmission data stored in the memory of the display device 100. In addition, the transmission data acquiring unit 114 may acquire, from the information reception unit 112, transmission data received by the information reception unit 112.

The video acquiring unit 116 acquires a video to be displayed. The video acquiring unit 116 may read the video stored in the memory of the display device 100. The video acquiring unit 116 acquires the video from the computer 102, for example. The video acquiring unit 116 may acquire a screensaver video as the video to be displayed.

The region identification unit 118 identifies a region in which, for a predetermined period, the brightness and color information do not change or the amount of change is lower than a predetermined threshold, within the video acquired by the video acquiring unit 116. The region identification unit 118 identifies a region in which there is no change, within the video, for example. The region identification unit 118 may identify a region in which, for a predetermined period, the brightness and color information do not change, within the video. In addition, the region identification unit 118 identifies a region in which the amount of change is lower than a predetermined threshold, within the video, for example. The region identification unit 118 may identify a region in which, for a predetermined period, the amount of change of the brightness and color information is lower than a predetermined threshold, within the video. The predetermined period may be changeable. In addition, the predetermined threshold may be changeable.

The video generating unit 120 generates an encoded video obtained by encoding each type of information into the video acquired by the video acquiring unit 116. For example, the video generating unit 120 generates an encoded video obtained by encoding transmission data acquired by the transmission data acquiring unit 114 as the optical communication signal, into the region identified by the region identification unit 118. When the video acquiring unit 116 acquired a screensaver video, the video generating unit 120 may generate an encoded video obtained by encoding a control signal into the region identified by the region identification unit 118, within the screensaver video. The control signal may be a signal used when measuring the reception brightness level and reception SNR (Signal to Noise Ratio) in the communication terminal 200.

In addition, the video generating unit 120, for example, generates an encoded video obtained by encoding, as an optical communication signal, region information indicating a region into which transmission data is encoded. The video generating unit 120 may generate an encoded video obtained by encoding, as an optical communication signal, region information into a region other than the region into which the transmission data is encoded.

In addition, the video generating unit 120, for example, generates an encoded video obtained by encoding, as an optical communication signal, terminal identification information for identifying a communication terminal 200. The video generating unit 120 may generate an encoded video obtained by encoding, as an optical communication signal, terminal identification information into a region other than the region into which the transmission data is encoded.

In addition, the video generating unit 120, for example, generates an encoded video obtained by encoding, as an optical communication signal, display device identification information for identifying a display device 100. The display device identification information may be an example of display unit identification information. The video generating unit 120 may generate an encoded video obtained by encoding, as an optical communication signal, display device identification information into a region other than the region into which the transmission data is encoded.

The video generating unit 120 may generate an encoded video obtained by encoding each type of information in a changeless video in which the entire video does not change.

The display control unit 122 causes the display unit to display an encoded video generated by the video generating unit 120. Examples of a display unit include a display 104 and a projector 105. The display control unit 122 may cause the display 104 to display an encoded video. In addition, the display control unit 122 may display an encoded video on the projector 105. In case where an encoded video obtained by encoding a control signal in a region identified by the region identification unit 118, within the screensaver video, is generated by the video generating unit 120, the display control unit 122 may cause the display unit to display the encoded video as a screensaver.

The measurement result reception unit 124 receives, from the communication terminal 200, the reception brightness level and reception SNR measured by the communication terminal 200 by capturing a video displayed by the display control unit 122.

The brightness level adjusting unit 126 adjusts the brightness level of the display by the display unit controlled by the display control unit 122, based on the measurement result received by the measurement result reception unit 124.

Figure 7:
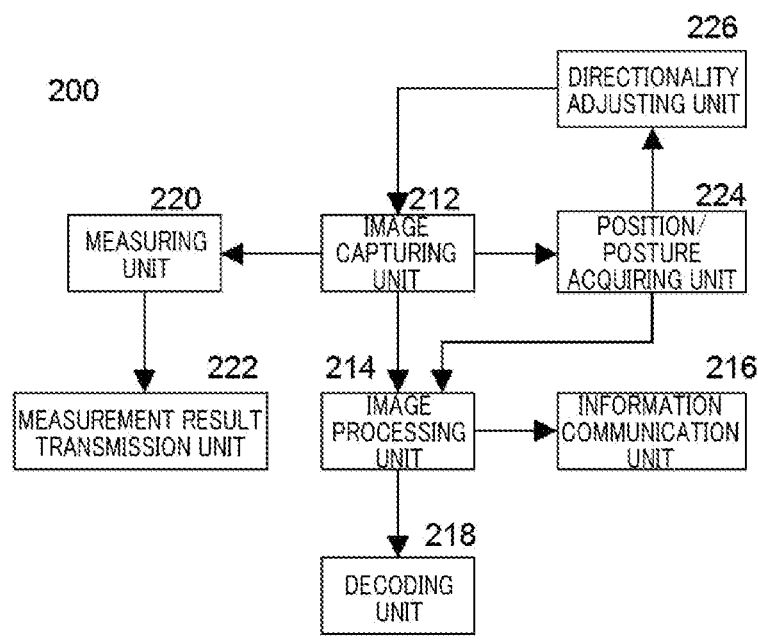
FIG. 7 schematically illustrates an example of functional configuration of the communication terminal 200.

FIG. 7 schematically illustrates an example of functional configuration of the communication terminal 200. The communication terminal 200 includes an image capturing unit 212, an image processing unit 214, an information communication unit 216, a decoding unit 218, a measuring unit 220, a measurement result transmission unit 222, a position/posture acquiring unit 224, and a directionality adjusting unit 226. Note that, the communication terminal 200 does not necessarily include all of these components.

The image processing unit 214 performs image processing on an image captured by the image capturing unit 212 using methods such as affine transformation. The image processing unit 214 may process a video captured by the image capturing unit 212 and displayed by the display control unit 122.

The image processing unit 214 may decode the region information encoded as an optical communication signal in the video to acquire the region information. The image processing unit 214 may identify a region into which transmission data is encoded, within the video captured by the image capturing unit 212, using the region information. The image processing unit 214 may be an example of the region identification unit.

The communication terminal 200 may transmit terminal identification information to the management device 300 via the network 50, and the management device 300 may transmit, via the network 50 to the display device 100, terminal identification information of the communication terminal 200 to be a communication partner of the display device 100. This terminal identification information may be notified to the communication terminal via optical communication from the display device 100. In addition, in case where terminal identification information is newly issued from the management device 300, the communication terminal 200 may acquire the above-described terminal identification information via the network 50.

In addition, the image processing unit 214 may decode the transmission data encoded as an optical communication signal in the video, using the terminal identification information. In this manner, the communication terminal 200 can normally decode data only when the transmission data encoded in the video is data addressed to itself.

The display device 100 may have a function to generate a different code for each of the communication terminals 200 to be a communication partner and transmit the code to the communication terminal 200 via optical communication.

The display device 100 may execute scrambling on the transmission data using a different code for each of the communication terminals 200 to be a communication partner.

The image processing unit 214 may execute descrambling on the transmission data scrambled by the display device 100, using a different code for each of the communication terminals transmitted from the display device.

In addition, the image processing unit 214 may decode the display device identification information encoded as an optical communication signal in the video to acquire the display device identification information. In this manner, the communication terminal 200 is able to identify the transmission data transmitted by a plurality of display devices 100.

The image processing unit 214 may analyze the video captured by the image capturing unit 212 and cause the information communication unit 216 to transmit captured video information related to the video. In accordance with the instruction by the image processing unit 214, the information communication unit 216 may transmit the captured video information to the display device 100, the management device 300 and the like.

The captured video information, for example, indicates a region, within the video displayed by the display control unit 122, that cannot be captured by the communication terminal 200 due to a situation in the transmission line between the display device 100 and the communication terminal 200. For example, the captured video information, for example, indicates a region, within the video displayed by the display control unit 122, that cannot be captured by the communication terminal 200 due to an obstacle or the like between the display device 100 and the communication terminal 200. In case where the display device 100 received the captured video information, the video generating unit 120 may generate an encoded video obtained by encoding, as an optical communication signal, the transmission data into a region excluding, from the region identified by the region identification unit 118, the region indicating the captured video information.

In case where the display device 100 and the communication terminal 200 are distanced apart and the transmission data or the like encoded in the video as an optical communication signal cannot be recognized, the image processing unit 214, for example, may cause the information communication unit 216 to transmit the captured video information indicating so to the management device 300 and the display device 100 via the network 50. In case where the display device 100 received the captured video information, the video generating unit 120 may change the number of pixels to which each piece of information of the transmission data is allocated. For example, when each piece of information of the transmission data is allocated to one pixel, the video generating unit 120 allocates each piece of information of the transmission data to more pixels such as four pixels, in response to receiving the captured video information.

In addition, in case where the display device 100 and the communication terminal 200 are nearby, and encoding of an optical communication signal in a video can be recognized even with higher resolution, the image processing unit 214, for example, may cause the information communication unit 216 to transmit the captured video information indicating so to the management device 300 and the display device 100 via the network 50. In case where the display device 100 received the captured video information, the video generating unit 120 may change the number of pixels to which each piece of information of the transmission data is allocated. For example, when each piece of information of the transmission data is allocated to four pixels, the video generating unit 120 allocates each piece of information of the transmission data to less pixels such as one pixel, in response to receiving the captured video information.

In case where the video displayed by the display control unit 122 cannot be captured by the image capturing unit 212, the image processing unit 214 may cause the information communication unit 216 to transmit notification data for notifying so. The image processing unit 214 may cause the information communication unit 216 to transmit the notification data to the display device 100. The information communication unit 216 may be an example of the notification data sending unit. In case where the display device 100 received the notification data, the video generating unit 120 may generate an encoded video obtained by encoding, as an optical communication signal, the transmission data acquired by the transmission data acquiring unit 114 by means of brightness modulation of the entire video. In this manner, communication can be achieved even when the displayed video by the display device 100 cannot be directly captured by the communication terminal 200, as long as a light of the displayed video can be indirectly captured.

The decoding unit 218 decodes transmission data from a region into which the transmission data is encoded, as identified by the image processing unit 214. The transmission data decoded by the decoding unit 218 may be stored in the memory of the communication terminal 200.

The measuring unit 220 measures the reception brightness level and reception SNR of the video captured by the image capturing unit 212. The measuring unit 220 may, for example, measure the reception brightness level and the reception SNR using a control signal decoded by the decoding unit 218 from a screensaver video displayed by the display control unit 122.

The measurement result transmission unit 222 transmits the measurement result by the measuring unit 220 to the display device 100. The measurement result transmission unit 222 may transmit the measurement result to the display device 100 without using optical communication. The measurement result transmission unit 222 may transmit the measurement result by the measuring unit 220 to the display device 100 via the management device 300. In case where the measurement result reception unit 124 received the measurement result transmitted by the measurement result transmission unit 222, the brightness level adjusting unit 126 may use the measurement result to adjust the brightness level to a minimum necessary brightness level.

The image capturing unit 212 may be a pinhole camera or an auto-focus camera. In addition, the directionality adjusting unit of the communication terminal 200 may have a zoom mechanism, a gimbal mechanism, and a three-dimensional oscillation mechanism.

In case where the region used for communication within the video captured by the image capturing unit 212 is small and the communication terminal 200 is fixed, the above-described three-dimensional oscillation mechanism or gimbal mechanism may be used as well as the zoom mechanism, to enlarge the region used for communication and reduce the number of pixels to which each piece of information of the transmission data is allocated. Since the display device 100 easily falls outside the range of the captured video in response to shaking of the communication terminal 200 or the like in case where a zoom mechanism is used for enlarged display on the display device 100, based on the information of the IMU (gyro device) mounted on a communication terminal 200, in case where the communication terminal 200 is fixed and stable, the directionality adjusting unit 226 may use three-dimensional oscillation mechanism to enlarge the display device 100 captured by the image capturing unit 212.

In case where the directionality adjusting unit 226 has a zoom mechanism but not the three-dimensional oscillation mechanism or the gimbal mechanism, and where there is shaking at the communication terminal 200, the directionality adjusting unit 226 may zoom out to adjust the display device 100 such that the display device 100 is stably included in the range of video captured by the image capturing unit 212. In this case, the decoding of transmission data transmitted from the display device 100 may be stabilized by increasing the number of pixels used for communication of the display device 100.

The video signal captured at the image capturing unit 212 may be forwarded to the decoding unit 218. The processing by the decoding unit 218 may be executed at the baseband IC. The decoding unit 218 performs, from the video signal captured at the image capturing unit 212, reading of a reference signal, affine transformation, identification and demodulation of an anchor signal, identification and demodulation of the data signal position, for example.

The processing of the decoding unit 218 may be performed at the DSP. The DSP to which the video signal is forwarded performs identification of a reference signal, affine transformation, reading of a reference signal, equalizing of brightness of the video, identification and baseband conversion of an anchor signal, identification and baseband conversion of a data signal and the like, for example. The DSP may forward reception signal data to the baseband IC after performing the above-described decoding process.

The position/posture acquiring unit 224 acquires the relative angle of the direction and position of the communication terminal 200, relative to the displayed video by the display device 100. The position/posture acquiring unit 224 may acquire the relative angle of the direction and position of the communication terminal 200 relative to the display 104, in case where the display device 100 causes the display 104 to display the video. The position/posture acquiring unit 224 may acquire the relative angle of the direction and position of the communication terminal 200 relative to the projected video 108, in case where the display device 100 causes the projector 105 to display the video.

The directionality adjusting unit 226 adjusts the directionality of capturing by the image capturing unit 212 based on the relative angle of the direction and position acquired by the position/posture acquiring unit 224. The directionality adjusting unit 226 may control the directionality of capturing by the image capturing unit 212, such that the displayed video by the display device 100 and the capturing direction by the image capturing unit 212 are directly opposite. That is, the directionality adjusting unit 226 may control the directionality of capturing by the image capturing unit 212, such that the display surface of the displayed video by the display device 100 and the capturing direction by the image capturing unit 212 are orthogonal. In case where the image capturing unit 212 has a function to adjust the lens with a three-dimensional actuator, the directionality adjusting unit 226 may change the direction of the lens using said function such that the displayed video by the display device 100 and the capturing direction by the image capturing unit 212 are directly opposite.

The communication terminal 200 may remove signals of display devices other than the display device to be the communication partner that exist in a range captured by the image capturing unit, based on its own terminal identification information, by using successive interference cancellation technology.

Figure 8:
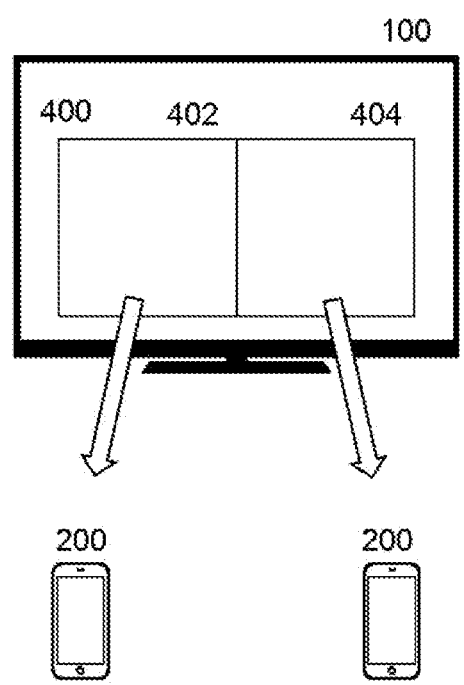
FIG. 8 schematically illustrates a display example of the display device 100.

FIG. 8 schematically illustrates a display example of the display device 100. FIG. 8 illustrates a display example in case where transmission data for different communication terminals 200 is encoded in each of the divided region 402 and divided region 404 obtained by dividing an identified region 400 identified by the region identification unit 118.

The display device 100 may generate a different spreading code for each of the communication terminals 200 used for interference cancellation at the communication terminal 200 side.

The display device 100 may transmit a different spreading code for each of the communication terminals 200 to the communication terminals 200 via optical communication.

The display device 100 may spread the spectrum of the video displayed on the display device 100 using a spreading code generated for each of the communication terminals 200 to be a communication partner.

As shown in FIG. 8, the display device 100 encodes the transmission data for one of the communication terminal 200 into the divided region 402 and notifies said communication terminal 200 of region information indicating the divided region 402, and encodes the transmission data for the other communication terminal 200 into the divided region 404 and notifies said other communication terminal 200 of region information indicating the divided region 404, thereby achieving simultaneous unicast communication among a plurality of communication terminals 200.

Figure 9:
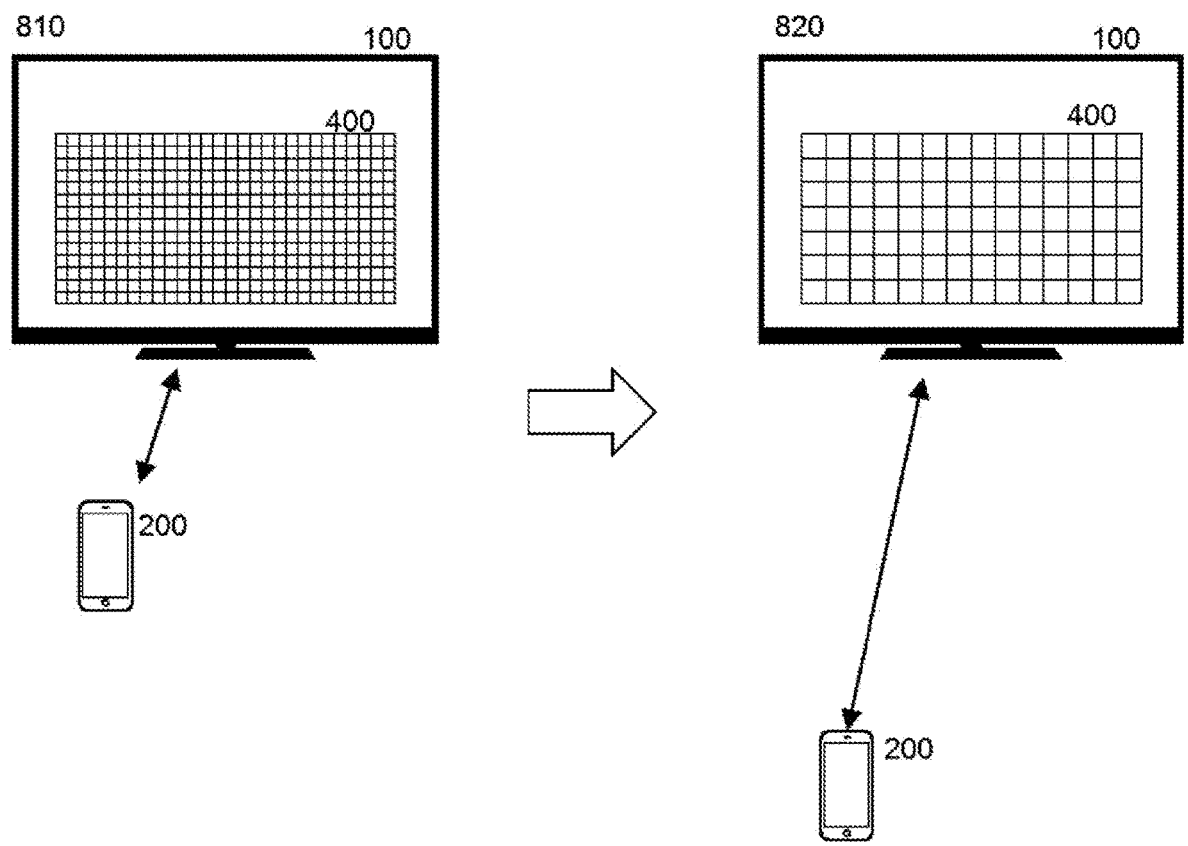
FIG. 9 schematically illustrates a display example of the display device 100.

FIG. 9 schematically illustrates a display example of the display device 100. While resolution that the communication terminal 200 can recognize varies depending on the distance between the display device 100 and the communication terminal 200 or the like, FIG. 9 schematically illustrates a case in which the display device 100 changes the number of pixels to which each piece of information of the transmission data is allocated, based on the resolution that the communication terminal 200 can recognize.

In the example shown in FIG. 9, the distance between the display device 100 and the communication terminal 200 is longer and resolution that the communication terminal 200 can recognize is lower in situation 820 than in situation 810. Therefore, the display device 100 in situation 820 has a larger number of pixels to which each piece of information of the transmission data is allocated. By executing such control with the display device 100, encoding of an optical communication signal suitable for the resolution that can be recognized by the communication terminal 200 can be achieved.

Figure 10:
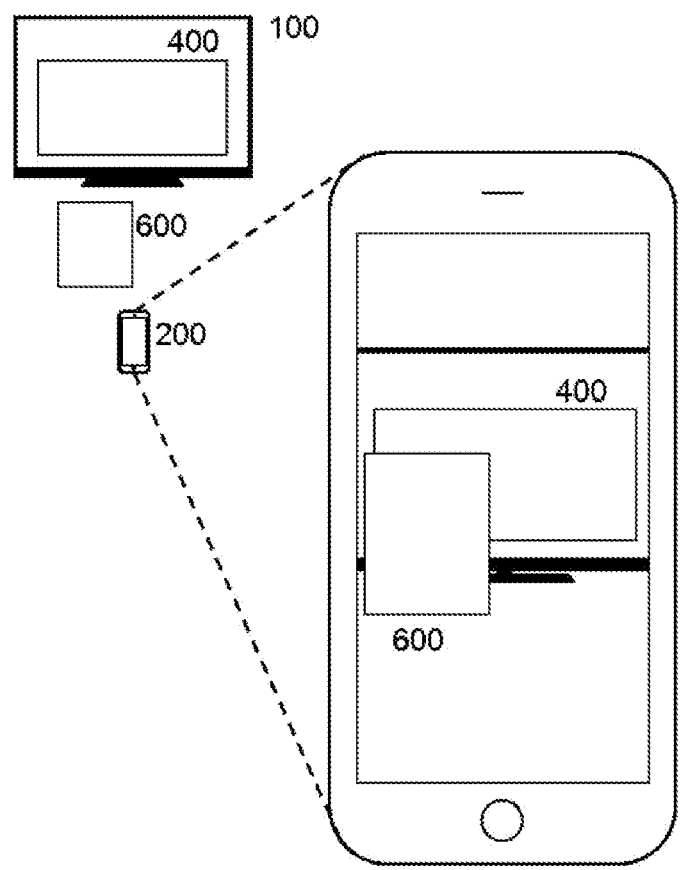
FIG. 10 schematically illustrates a display example of captured videos by the communication terminal 200.

FIG. 10 schematically illustrates a display example of captured videos by the communication terminal 200. FIG. 10 illustrates a situation in which a portion of an identified region 400 cannot be captured by the communication terminal 200 due to an obstacle 600 existing between the display device 100 and the communication terminal 200.

Figure 11:
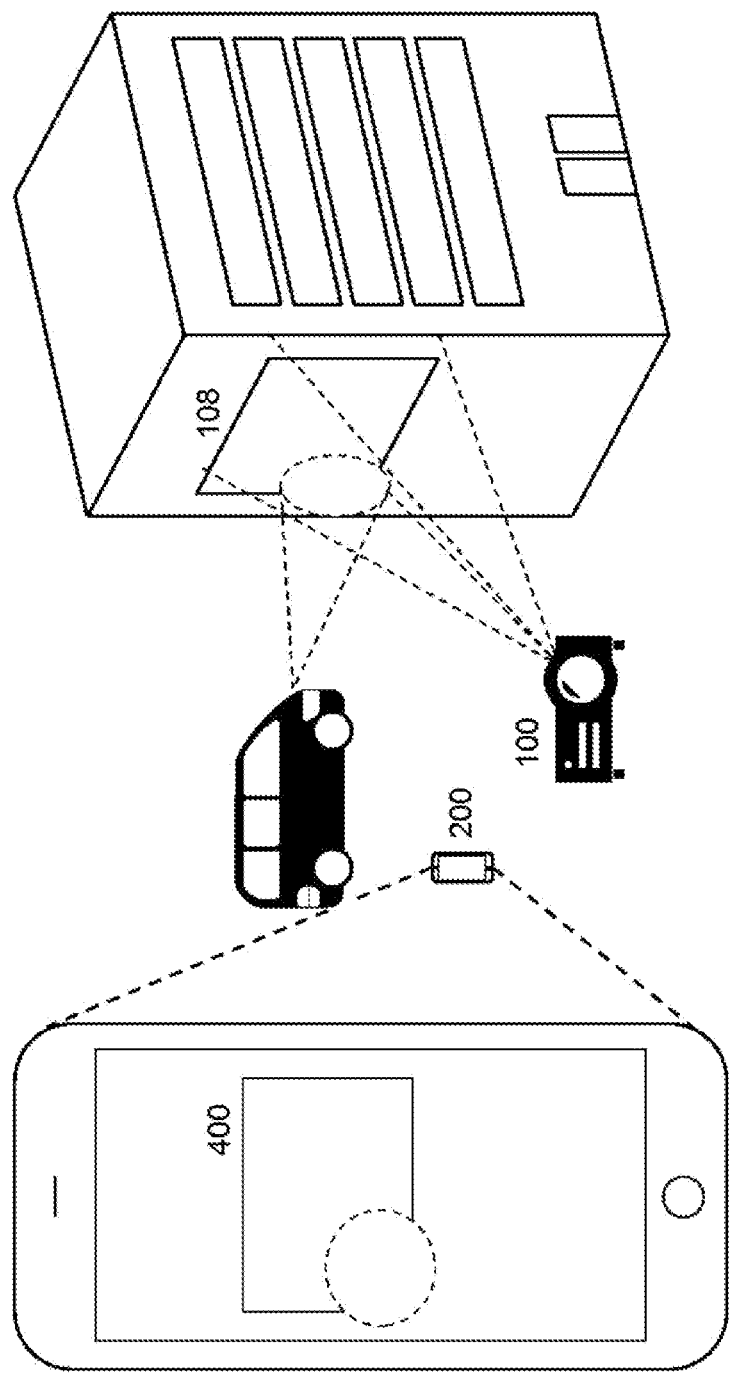
FIG. 11 schematically illustrates a display example of captured videos by the communication terminal 200.

FIG. 11 illustrates a situation in which a projected video 108 projected by the display device 100 is partially irradiated by other strong light from the outside and the communication terminal 200 cannot recognize information on a portion of the identified region 400.

In the situations illustrated in FIG. 10 and FIG. 11, the information communication unit 216 transmits, to the display device 100, captured video information indicating a region that cannot be captured due to the obstacle 600, within a video displayed by the display device 100, or a region that cannot be recognized due to an external strong light, within the projected video 108. Based on the captured video information, the video generating unit 120 may generate an encoded video obtained by encoding transmission data or the like in a region excluding, from the identified region 400 identified by the region identification unit 118, the region that cannot be captured by the communication terminal 200 or the region in which a signal cannot be recognized. In this manner, an occurrence of a situation in which transmission data is encoded in the identified region 400 by the display device 100 but it cannot be received by the communication terminal 200 due to the existence of an obstacle 600 or an external strong light can be prevented.

Figure 12:
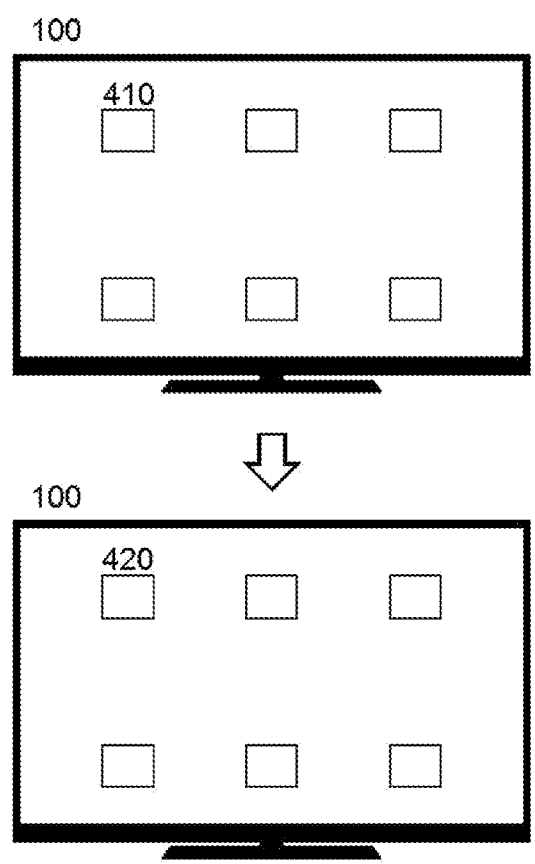
FIG. 12 schematically illustrates examples of a synchronization signal 410 and a call signal 420 by the display device 100.

FIG. 12 schematically illustrates examples of a synchronization signal 410 and a call signal 420 by the display device 100. The display device 100 periodically displays the synchronization signal 410. The display device 100 displays a synchronization signal 410 for every 30 frames, for example. In FIG. 12, a case in which six synchronization signals 410 are displayed is illustrated, but the number, the position, and the size of the synchronization signals 410 are not limited to those illustrated in FIG. 12, and may be set arbitrarily.

The display device 100 may encode the display device identification information for identifying the display device 100 into the synchronization signal 410. In addition, the display device 100 may encode screen resolution information of the screen of the display device 100 into the synchronization signal 410. In addition, the display device 100 may encode frame number information into the synchronization signal 410. The modulation of the synchronization signal 410 may be modulation using Zadff-Chu sequence, for example.

The communication terminal 200 which captured and read the synchronization signal 410 transmits, to the management device 300 via the network 50, an attach complete message to communicate the fact that reception of the synchronization signal by the display device 100 which is the communication partner has been successfully completed. The attach complete message may include terminal identification information for identifying the communication terminal 200. In addition, the attach complete message may include display device identification information included in the synchronization signal 410. In addition, the attach complete message may include reception resolution information of reception by the communication terminal 200.

The management device 300 transmits the information received from the communication terminal 200 to the display device 100 via the network 50. Regarding the terminal identification information among the information received from the communication terminal 200, the management device 300 may generate another new terminal identification information to be used temporarily until the communication is disconnected, in order to protect individual information of the terminal. The display device 100 may have a function to generate said terminal identification information. The display device 100 that received said information displays a call signal 420 at the same position as the synchronization signal 410. The display device 100 may periodically display the call signal 420. The display device 100 displays the call signal 420 for every 30 frames, for example. The call signal 420 may included terminal identification information of the communication terminal 200. The call signal 420 may include terminal identification information of the communication terminal 200 to be a communication target, and extended information.

The communication terminal 200 receives a call signal 420 displayed by the display device 100, and transmits a call complete message to the management device 300 via the network 50 if the terminal identification information included in the call signal 420 matches its own terminal identification information. The management device 300 may transmit the call complete message it received to the display device 100.

The anchor signal 430 may be a signal included in a region into which the region information indicating the region into which the transmission data is encoded is encoded as an optical communication signal. The display device 100 that received the call complete message transmits, to the management device 300 via the network 50, the position of the anchor signal 430 and the frame number in which anchor signal 430 is arranged. The size of the display of the anchor signal 430 may be determined based on the reception resolution information described in the method for preparing to initiate a communication. The management device 300 transmits, to the communication terminal 200 via the network 50, information related to the received anchor signal 430. The communication terminal 200 initiates the decoding of the region into which transmission data is encoded, in response to receiving, from the management device 300, the information related to the anchor signal 430.

Figure 13:
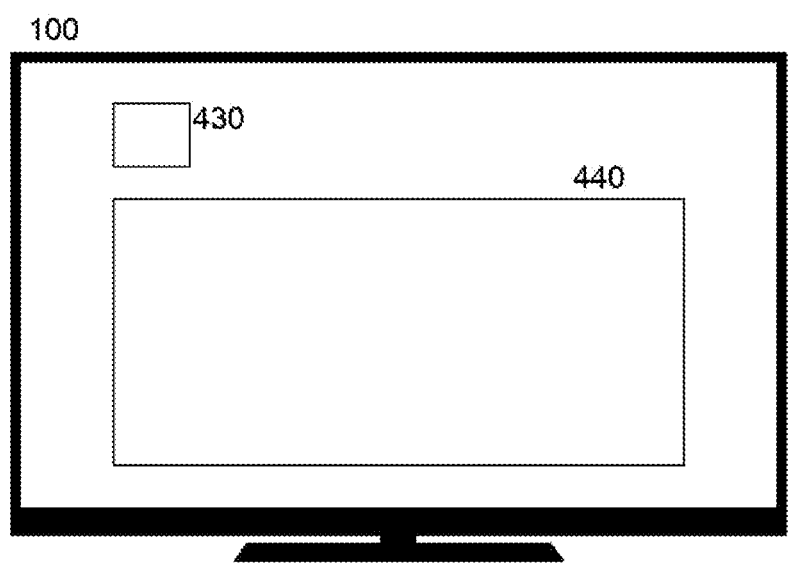
FIG. 13 schematically illustrates a display example by the display device 100 in a communication phase.

FIG. 13 schematically illustrates a display example by the display device 100 during optical communication. Here, a case where a white region is adopted as an example of a region in which, for a predetermined period, the brightness and color information do not change or the amount of change is lower than a predetermined threshold is exemplified.

The region identification unit 118 analyzes the video acquired by the video acquiring unit 116 and identifies a white region. The video generating unit 120 includes an anchor signal 430, and generates an encoded video obtained by encoding, as an visible optical communication signal, the transmission data acquired by the transmission data acquiring unit 114 into an identified region 440 identified by the region identification unit 118. The anchor signal 430 includes region information indicating the identified region 440. The display control unit 122 causes the encoded video generated by the video generating unit 120 to be displayed.

The communication terminal 200 captures, by the image capturing unit 212, the encoded video displayed by the display control unit 122. The image processing unit 214 identifies the identified region 440 using the region information indicating the identified region 440 included in the anchor signal 430. The decoding unit 218 decodes the transmission data from the identified region 440 identified by the image processing unit 214.

The video generating unit 120 may include, for each predetermined frames, such as for each ten frames, for example, a training signal at the identified region 440 and the position of the anchor signal 430, and the communication terminal 200 may use the training signal to perform equalizing on the captured video. In this way, the transmission data can be accurately decoded by performing uniformization of brightness and color information of the video. In addition, the video generating unit 120 may transmit the same contents for a plurality of frames, when encoding the transmission data into the identified region 440. In this manner, the transmission data can be made redundant, thereby reducing the error rate.

The communication terminal 200 may transmit error information to the management device 300 via the network 50 in case where an error occurs in the received transmission data. The management device 300 may transmit the received error information to the display device 100 via the network 50. The display device 100 may resend the transmission data in which the error occurred, based on the received error information.

The communication terminal 200 may transmit the reception resolution information to the management device 300 via the network 50 for every predetermined period. The management device 300 may transmit the received reception resolution information to the display device 100 via the network 50. The display device 100 may execute adjustment for the magnitude of the anchor signal 430 and the number of pixels to which each piece of information of the transmission data is allocated, based on the received reception resolution information.

In case where the communication terminal 200 has an optical zoom function, the communication terminal 200 may appropriately zoom the displayed video by the display device 100. In addition, in case where the communication terminal 200 has a lens equipped with a three-dimensional actuator, the communication terminal 200 may appropriately zoom the displayed video by the display device 100 and execute adjustment of the directionality. The communication terminal 200 may have a mechanism to correct camera shake.

In case where the display device 100 and the communication terminal 200 are not directly opposite, the communication terminal 200 may appropriately perform affine transformation on the displayed video by the display device 100.

The display device 100 may include a CPRI (Common Public Radio Interface) interface, HDMI (registered trademark) (High-Definition Multimedia Interface) interface, and a circuit for modulating the optical communication signal from an IQ signal (a baseband signal consisting of in-phase and quadrature components of a complex digital signal) on the CPRI interface.

Figure 14:
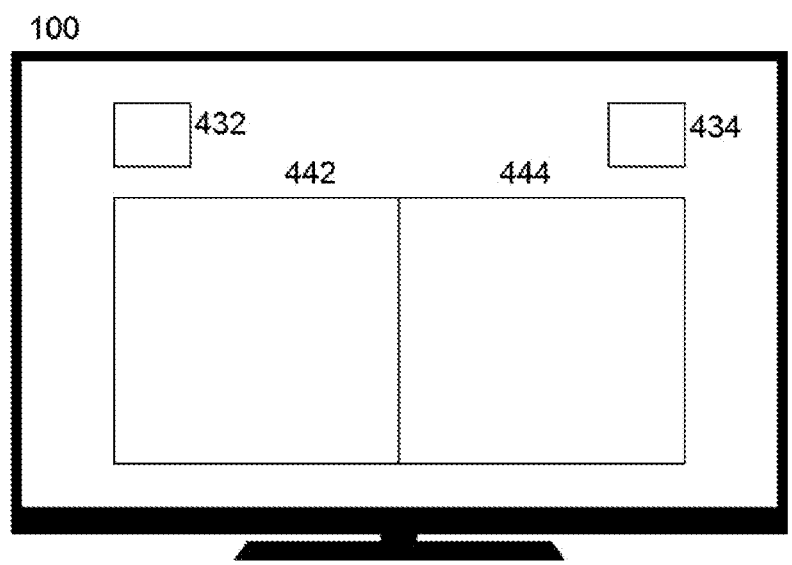
FIG. 14 schematically illustrates a display example by the display device 100 in the communication phase.

FIG. 14 illustrates a display example in case where transmission data is encoded for two communication terminals 200 by the display device 100. In FIG. 14, schematically illustrates an example of the anchor signal 432 and the anchor signal 434, and divided regions 442 and 444 in which the transmission data indicated by each of the anchor signals is encoded.

Figure 15:
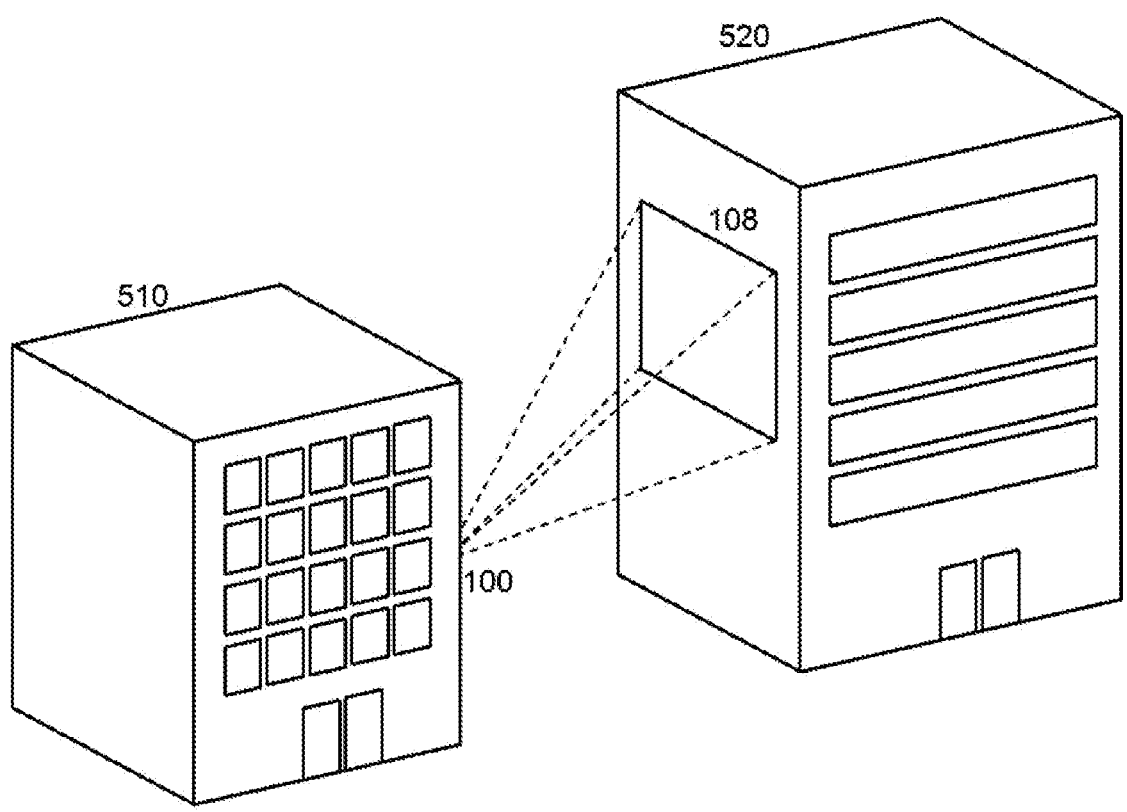
FIG. 15 schematically illustrates an example of a projected video 108.

FIG. 15 schematically illustrates an example of a projected video 108. FIG. 15 illustrates an example in which a projected video 108 is projected onto the wall surface of a neighboring building 520 by a display device 100 placed in the building 510.

In this manner, display device 100 can transmit the transmission data to the communication terminal 200 that is capable of capturing the wall surface of the building 520. The communication terminal 200 may be placed on the ground or may be placed in the building 510.

In FIG. 15, the example is shown with the video projected upward by the display device 100, but it is not limited thereto and the direction of the display device 100 may be arbitrary.

When the projected video 108 is projected onto the building 520, the display device 100 may generate and project an encoded video obtained by encoding, as an optical communication signal, the transmission data into a portion of or the entire video in which contents do not change, and when a communication terminal 200 having sensitivity in an infrared area is assumed as the communication partner, the display device 100 may generate and project an encoded video obtained by encoding, as an optical communication signal, the transmission data into the infrared ray. The display device 100 may generate an encoded video obtained by encoding, as an optical communication signal, transmission data into the region in which, for a predetermined period, the brightness and color information do not change or the amount of change is lower than a predetermined threshold, within the video in which the contents change.

Figure 16:
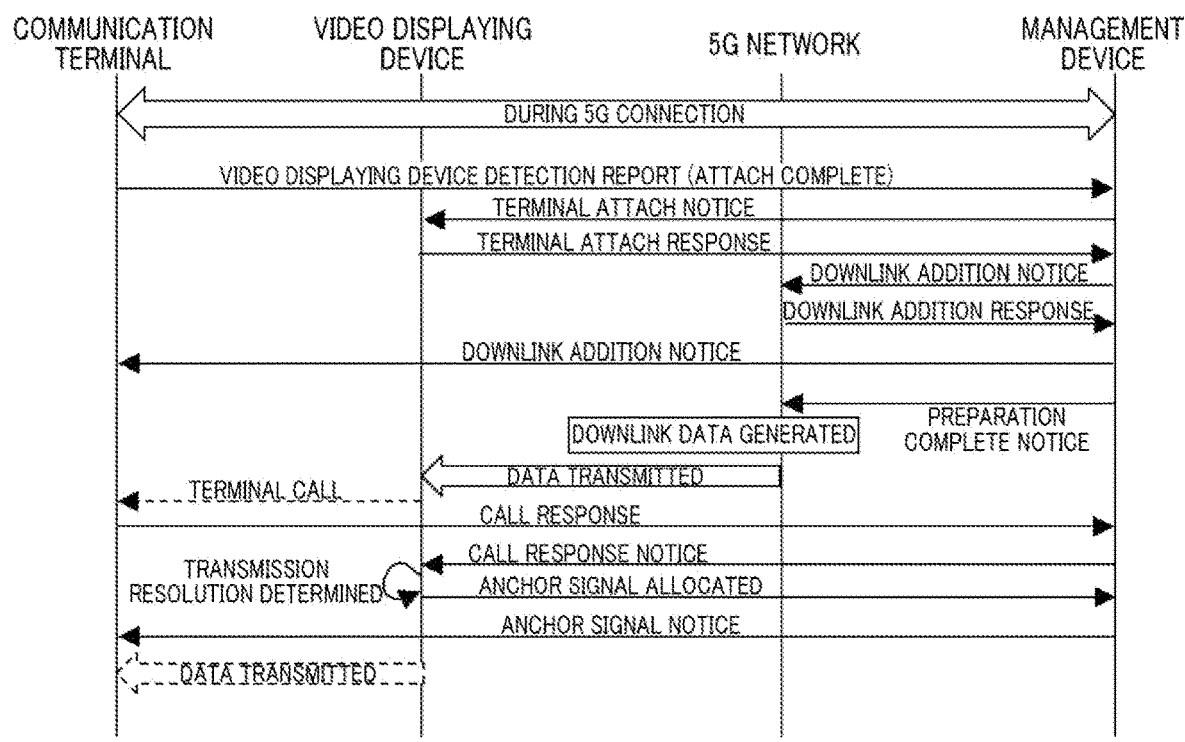
FIG. 16 schematically illustrates a control message sequence (example) for initiating communication.

FIG. 16 illustrates a control message sequence (example) for initiating communication between the communication terminal 200, the display device 100, the 5G network, and the management device 300. In this example, first, the communication terminal 200 transmits a video displaying device detection report (attach complete) to the management device 300. Next, the management device 300 transmits terminal attach notice to the video displaying device 100. Next, the video displaying device 100 transmits terminal Attach response to the management device 300. Next, the management device 300 transmits downlink addition notice to the 5G network. Next, the management device 300 receives a downlink addition response to the 5G network. Next, the management device 300 transmits a downlink addition notice to the communication terminal 200. Next, the management device 300 transmits a preparation complete notice to the 5G network.

Subsequently, in the 5G network, downlink data is generated. The data generated is then transmitted from the 5G network to the display device 100. The display device 100 that received the data executes a terminal call to the communication terminal 200. Next, the communication terminal 200 transmits a call response to the management device 300. The management device 300 transmits a call response notice to the display device 100. The display device 100 that received the call response notice determines the transmission resolution. The display device 100 then allocates an anchor signal to the management device 300. The management device 300 notifies the communication terminal 200 of the anchor signal. The display device 100 then performs data transmission to the communication terminal 200 via displaying.

Figure 17:
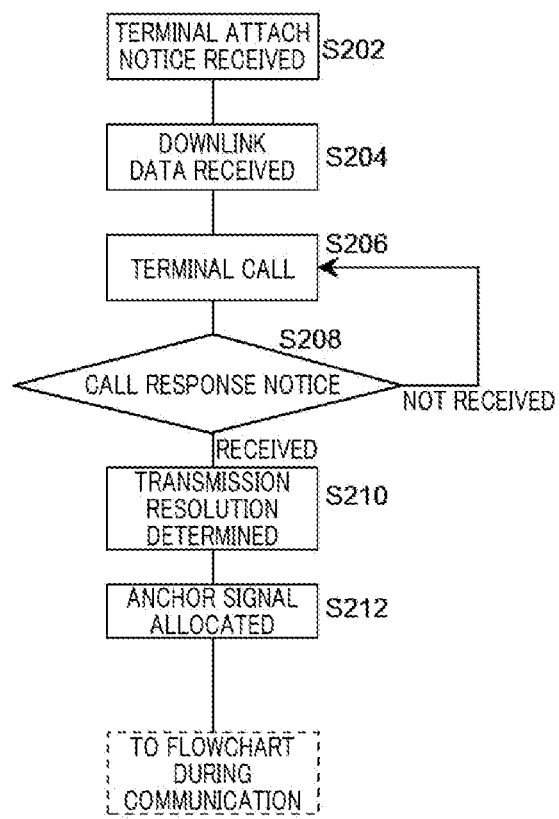
FIG. 17 schematically illustrates a flowchart (example) to initiate communication on the display device 100 side.

FIG. 17 schematically illustrates a flowchart (example) to initiate communication on the display device 100 side. At step (steps may be abbreviated as S) 202, terminal Attach notice is received from the management device 300. At S204, downlink data is received from the 5G network. At S206, terminal call is executed for the communication terminal 200. At S208, it is judged whether a call response notice for the terminal call at S 206 has been received. When it is judged that a call response notice has not been received, the procedure is returned to S206, and when it is judged that a call response notice has been received, the procedure proceeds to S210. At S210, the transmission resolution is determined. At S212, an anchor signal is allocated to the management device 300. Communication is initiated according to the above-described procedure.

Figure 18:
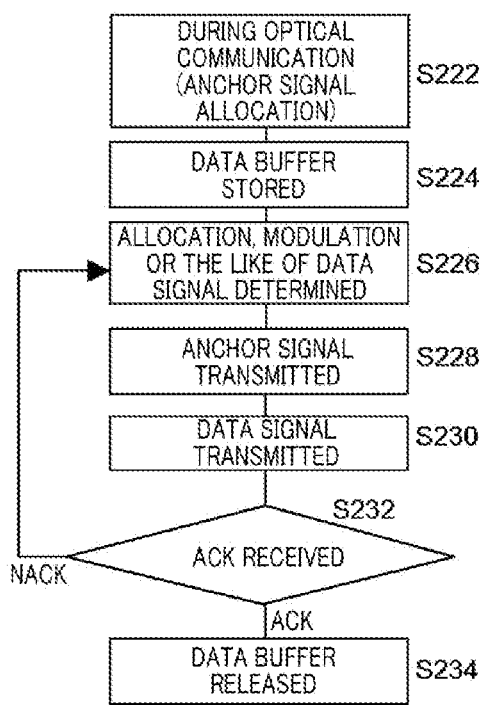
FIG. 18 schematically illustrates a flowchart (example) during communication on the display device 100 side.

FIG. 18 schematically illustrates a flowchart (example) during communication on the display device 100 side. At S222, optical communication (anchor signal allocation) is executed for the communication terminal 200. At S224, data is stored in the buffer. At S226, allocation, modulation or the like of the data signal is determined. At S228, the anchor signal is transmitted. At S230, the data signal is transmitted. At S232, it is judged whether an ACK has been received. When it is judged that an ACK has not been received, the procedure returns to S226, and when it is judged that an ACK has been received, the procedure proceeds to S234. At S234, the buffer of the data is released.

Figure 19:
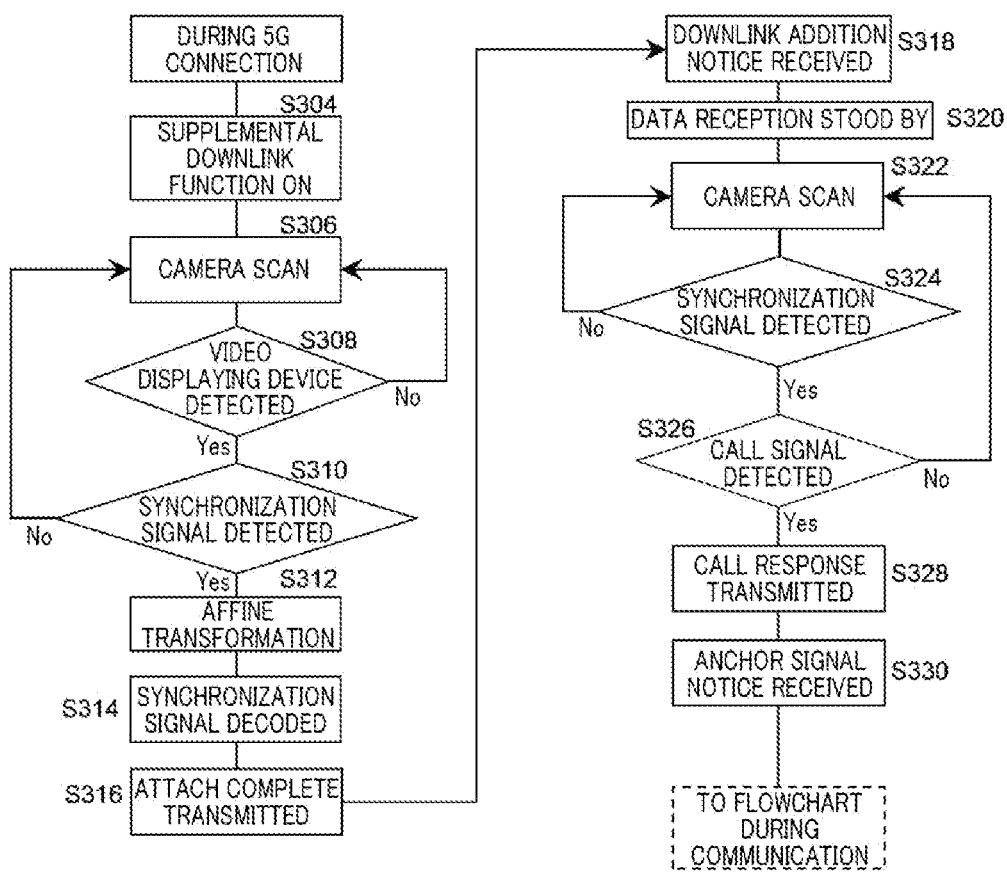
FIG. 19 schematically illustrates a flowchart (example) to initiate communication on the communication terminal 200 side.

FIG. 19 schematically illustrates a flowchart (example) to initiate communication on the communication terminal 200 side. During 5G connection, the communication terminal 200 turns on the supplemental downlink function at S304. At S306, a camera scan is executed. At S308, when the display device 100 is detected, the procedure proceeds to S310, and when the display device 100 is not detected, the procedure returns to S306. At S310, when a synchronization signal is detected, the procedure proceeds to S312, and when a synchronization signal is not detected, the procedure returns to S306.

At S312, affine transformation is performed on the video scanned by the camera. At S314, the synchronization signal is decoded. At S316, an Attach complete notice is transmitted. At S318, a downlink addition notice is received. At S320, data reception is stood by. At S322, camera scan is executed. At S324, when the synchronization signal is detected, the procedure proceeds to S326, and when the synchronization signal is not detected, the procedure returns to S322. At S326, when the call signal is detected, the procedure proceeds to S328, and when the call signal is not detected, the procedure returns to S322. At S328, the call response is transmitted. At S330, an anchor signal notice is received. Communication is initiated according to the above-described procedure.

Figure 20:
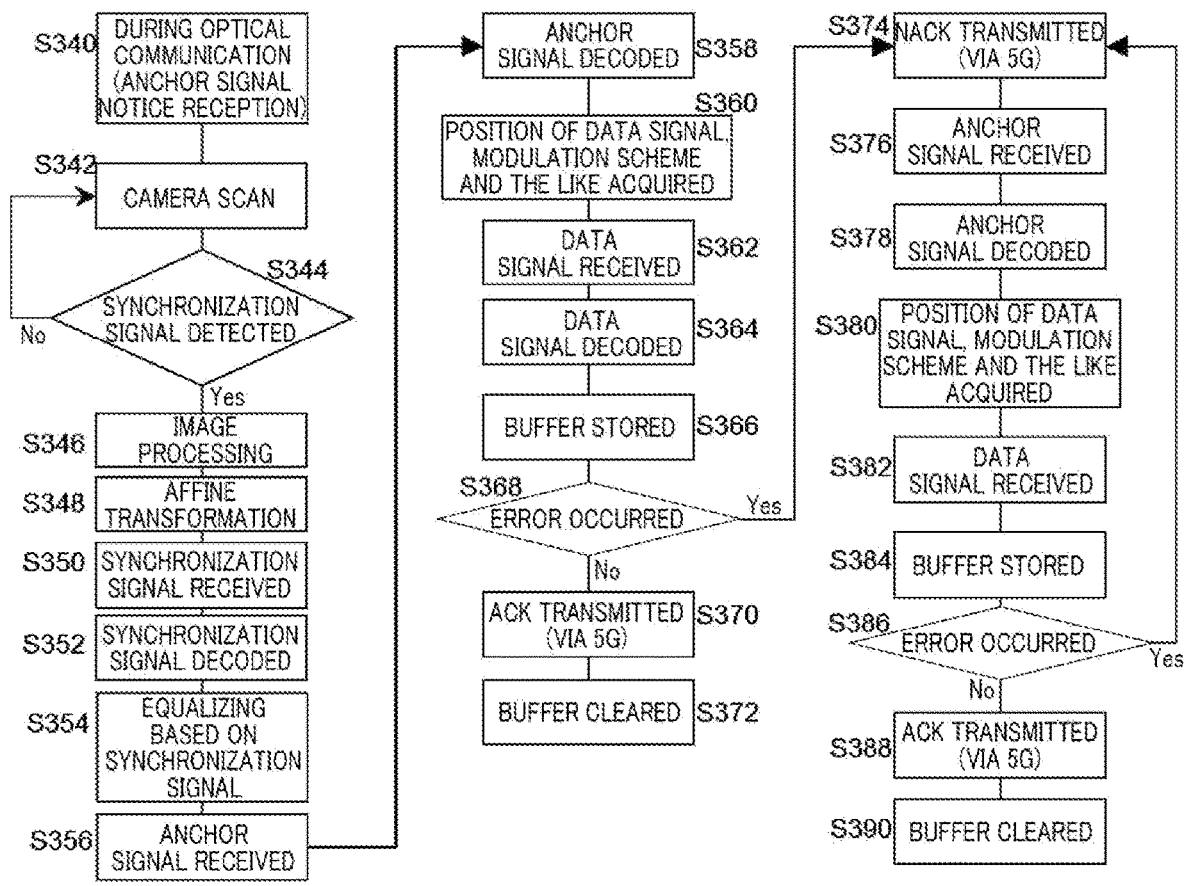
FIG. 20 schematically illustrates a flowchart (example) during communication on the communication terminal 200 side.

FIG. 20 schematically illustrates a flowchart (example) during communication on the communication terminal 200 side. At S340, optical communication is executed with the display device 100. At S342, camera scan is executed. At S344, when a synchronization signal is detected, the procedure proceeds to S346, and when a synchronization signal is not detected, the procedure returns to S342.

At S346, an image processing is executed on the image scanned by the camera. At S348, affine transformation is executed. At S350, a synchronization signal is received. At S352, the synchronization signal is decoded. At S354, equalizing is executed based on the synchronization signal.

At S356, an anchor signal is received. At S358, the anchor signal is decoded. At S360, the position of the data signal, the modulation scheme and the like are acquired. At S362, a data signal is received. At S364, the data signal is decoded. At S366, the data signal is stored in the buffer. At S368, when it is judged that an error has occurred, the procedure proceeds to S376, and when it is judged that an error has not occurred, the procedure proceeds to S370. At S370, an ACK is transmitted via 5G. At S372, the buffer is cleared.

At S374, NACK is transmitted via 5G. At S376, an anchor signal is received. At S378, the anchor signal is decoded. At S380, the position of the data signal, the modulation scheme and the like are acquired. At S382, a data signal is received. At S384, the data signal is stored in the buffer. At S386, when it is judged that an error has occurred, the procedure returns to S374, and when it is judged that an error has not occurred, the procedure proceeds to S388. At S388, ACK is transmitted via 5G. At S390, the buffer is cleared.

Figure 21:
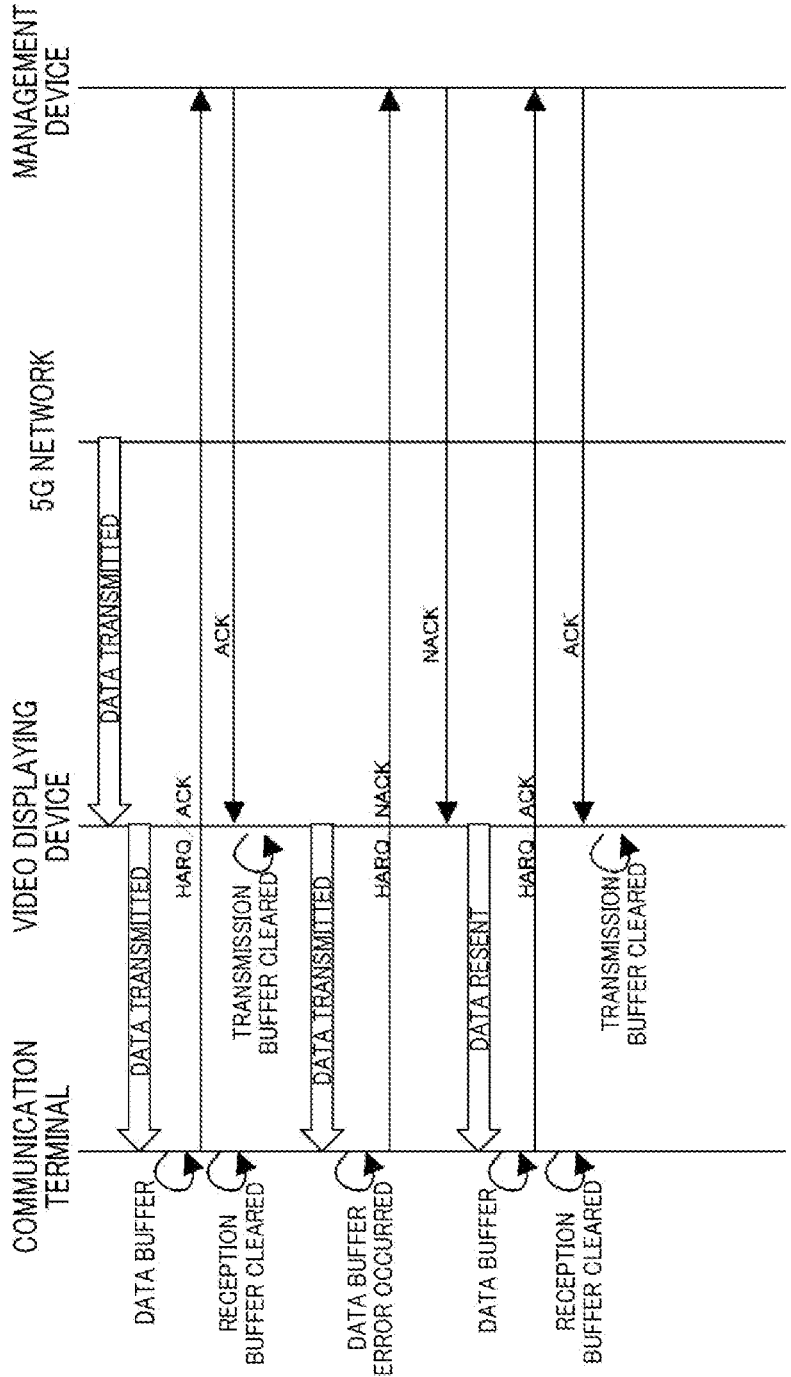
FIG. 21 schematically illustrates a resending sequence (example) during communication.

FIG. 21 schematically illustrates a resending sequence (example) during communication. In the sequence illustrated in FIG. 21, data is first transmitted from the 5G network to the display device 100. The display device 100 transmits data to the communication terminal 200. The communication terminal 200 buffers the data. Next, the communication terminal 200 transmits HARQ/ACK to the management device 300. The communication terminal 200 then clears the reception buffer.

The management device 300 that received the HARQ/ACK transmits the ACK to the display device 100. The display device 100 clears the transmission buffer. The display device 100 then transmits the data to the communication terminal 200. The communication terminal 200 buffers the data. In this sequence, a case in which an error has occurred will be described.

The communication terminal 200 transmits HARQ/NACK to the management device 300. The management device 300 that received the HARQ/NACK transmits the NACK to the display device 100. The display device 100 resends the data to the communication terminal 200. The communication terminal 200 buffers the data. Next, the communication terminal 200 transmits the HARQ/ACK to the management device 300. The communication terminal 200 then clear the reception buffer. The management device 300 that received the HARQ/ACK transmits ACK to the display device 100. The display device 100 clears the transmission buffer.

Figure 22:
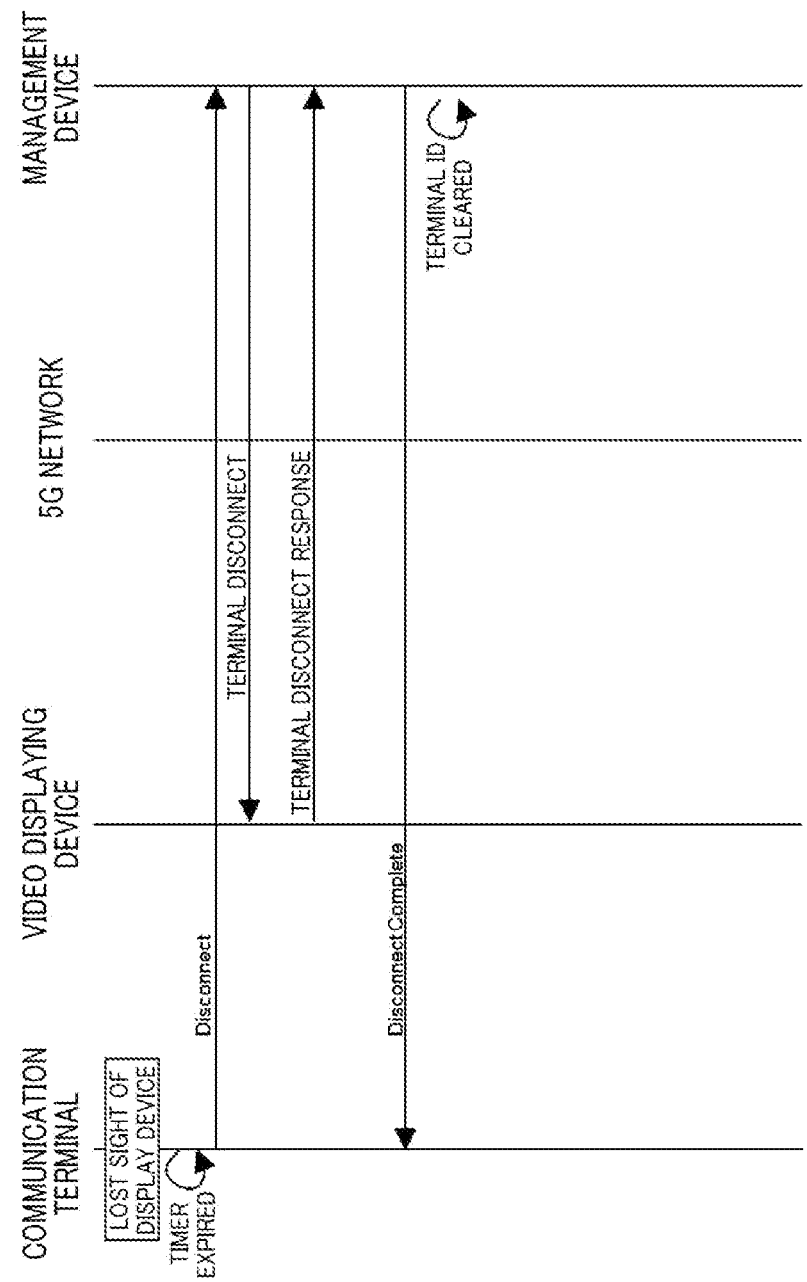
FIG. 22 schematically illustrates a flowchart for ending communication.

FIG. 22 schematically illustrates a flowchart for ending communication. Here, a procedure of a process after the communication terminal 200 has lost sight of the display device 100 during communication between the communication terminal 200 and the display device 100 is schematically illustrated.

The communication terminal 200 activates a timer in response to losing sight of the display device 100. The communication terminal 200 transmits Disconnect to the management device 300, in response to expiration of the timer. The management device 300 transmits terminal Disconnect to the display device 100. The display device 100 transmits terminal Disconnect response to the management device 300. The management device 300 transmits Disconnect Complete to the communication terminal 200. The management device 300 then clears the terminal ID.

Figure 23:
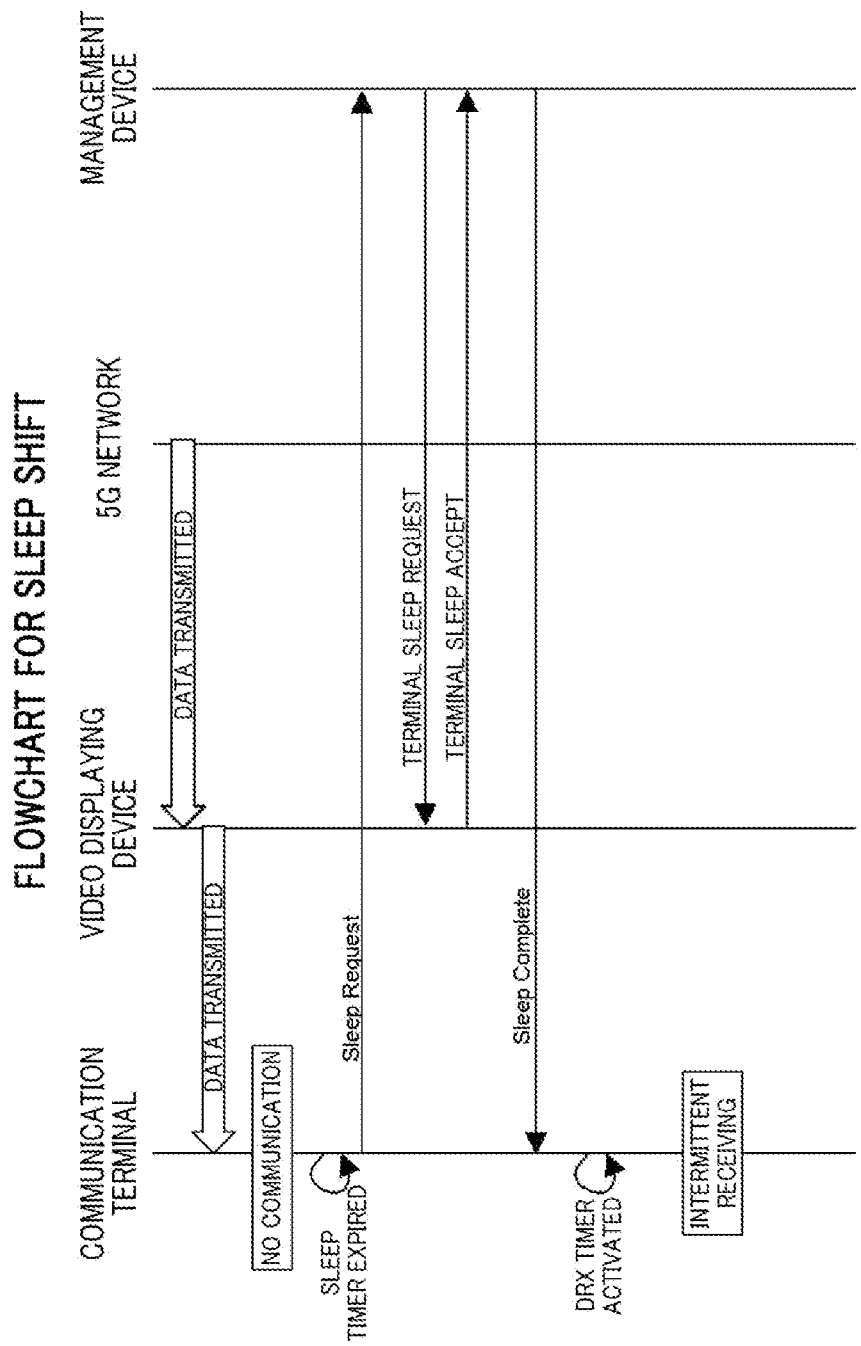
FIG. 23 schematically illustrates a flowchart for sleep shift.

FIG. 23 schematically illustrates a flowchart for sleep shift. In the sequence illustrated in FIG. 23, data is first transmitted from the 5G network to the display device 100. The display device 100 transmits the data to the communication terminal 200.

In this example, description will continue with an assumption that the sleep timer has expired without communication by the communication terminal 200 that received the data. The communication terminal 200 transmits a Sleep Request to the management device 300. The management device 300 transmits a terminal Sleep Request to the display device 100. The display device 100 transmits a terminal Sleep Accept to the management device 300. The management device 300 transmits Sleep Complete to the communication terminal 200. The communication terminal 200 activates a DRX timer. The communication terminal 200 then is brought into an intermittent receiving state.

Figure 24:
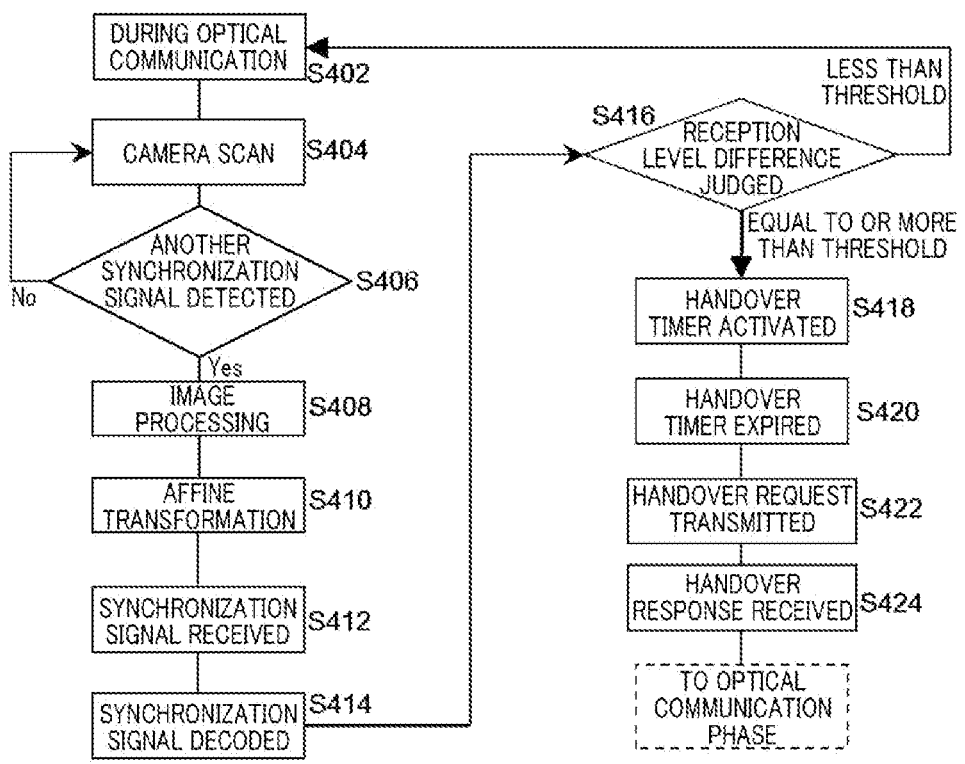
FIG. 24 schematically illustrates a flowchart for handover.

FIG. 24 schematically illustrates a flowchart for handover. At S402, optical communication is executed between the communication terminal 200 and the display device 100. At S404, the communication terminal 200 executes a camera scan. At S406, the communication terminal 200 judges whether another synchronization signal has been detected. When it is judged that another synchronization signal has been detected, the procedure proceeds to S408, and when it is judged that another synchronization signal has not been detected, the procedure returns to S404.

At S408, the communication terminal 200 executes image processing on the image scanned by the camera. At S410, the communication terminal 200 executes affine transformation. At S412, the communication terminal 200 receives the synchronization signal. At S414, the communication terminal 200 decodes the synchronization signal. At S416, when the communication terminal 200 executes judging of the reception level difference, and when it is judged to be equal to or more than a threshold, the procedure proceeds to S418, and when it is judged to be less than the threshold, the procedure returns to S402.

At S418, the communication terminal 200 activates a handover timer. As S420, the communication terminal 200 causes the handover timer to expire. At S422, the communication terminal 200 transmits a handover request. At S424, the communication terminal 200 receives a handover response. The communication terminal 200 then shifts to an optical communication phase with the display device that is a handover destination.

Figure 25:
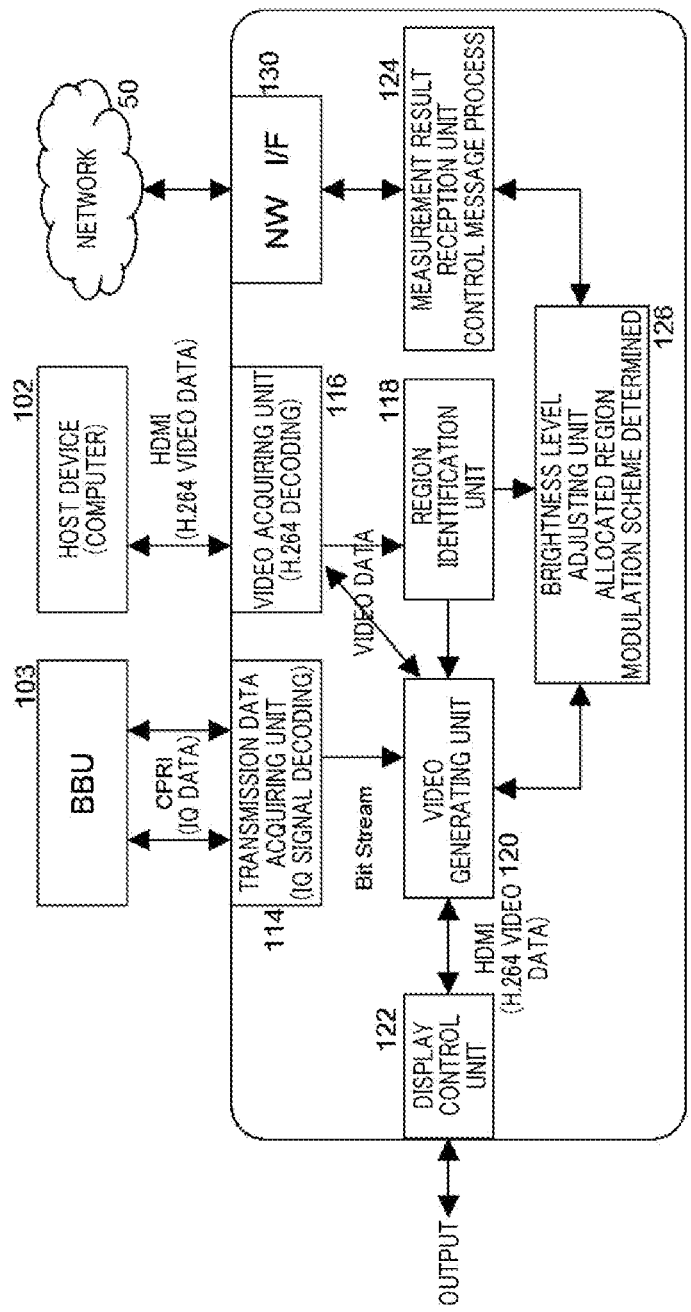
FIG. 25 schematically illustrates Set Top Box internal block diagram (example).

FIG. 25 schematically illustrates Set Top Box internal block diagram (example). The Set Top Box includes a transmission data acquiring unit 114, a video acquiring unit 116, a region identification unit 118, a video generating unit 120, a display control unit 122, a measurement result reception unit 124, a brightness level adjusting unit 126, and a NW I/F 130. These components may execute the functions described in FIG. 6.

The transmission data acquiring unit 114 communicates with the BBU 103 via the CPRI. The transmission data acquiring unit 114 may communicate the IQ data. The transmission data acquiring unit 114 may decode the received IQ signal. The transmission data acquiring unit 114 transmits a Bit Stream to the video generating unit 120.

The video acquiring unit 116 communicates, via an HDMI, with the computer 102, which is an example of a host device. The video acquiring unit 116 may communicate the H.264 video data. The video acquiring unit 116 may execute H.264 decoding. The video acquiring unit 116 transmits and receives the acquired video data with the video generating unit 120. In addition, the video acquiring unit 116 transmits the acquired video data to the region identification unit 118. The region identification unit 118 identifies a region in which, for a predetermined period, the brightness and color information do not change or the amount of change is lower than a predetermined threshold, within the video data.

The video generating unit 120 generates an encoded video obtained by encoding each type of information into the video data received from the video acquiring unit 116. For example, the video generating unit 120 generates an encoded video obtained by encoding transmission data acquired by the transmission data acquiring unit 114 as the optical communication signal, into the region identified by the region identification unit 118. The video generating unit 120 transmits the encoded video as the H.264 video data to the display control unit 122 via HDMI. The display control unit 122 causes the display unit to display the received video data.

The measurement result reception unit 124 receives, via the network 50 and the NW I/F 130, the reception brightness level and reception SNR measured by the communication terminal 200 by capturing a video displayed by the display control unit 122. The measurement result reception unit 124 may execute a control message process. The brightness level adjusting unit 126 may adjust the brightness level of the display by the display unit controlled by the display control unit 122, based on the measurement result received by the measurement result reception unit 124.

Figure 26:
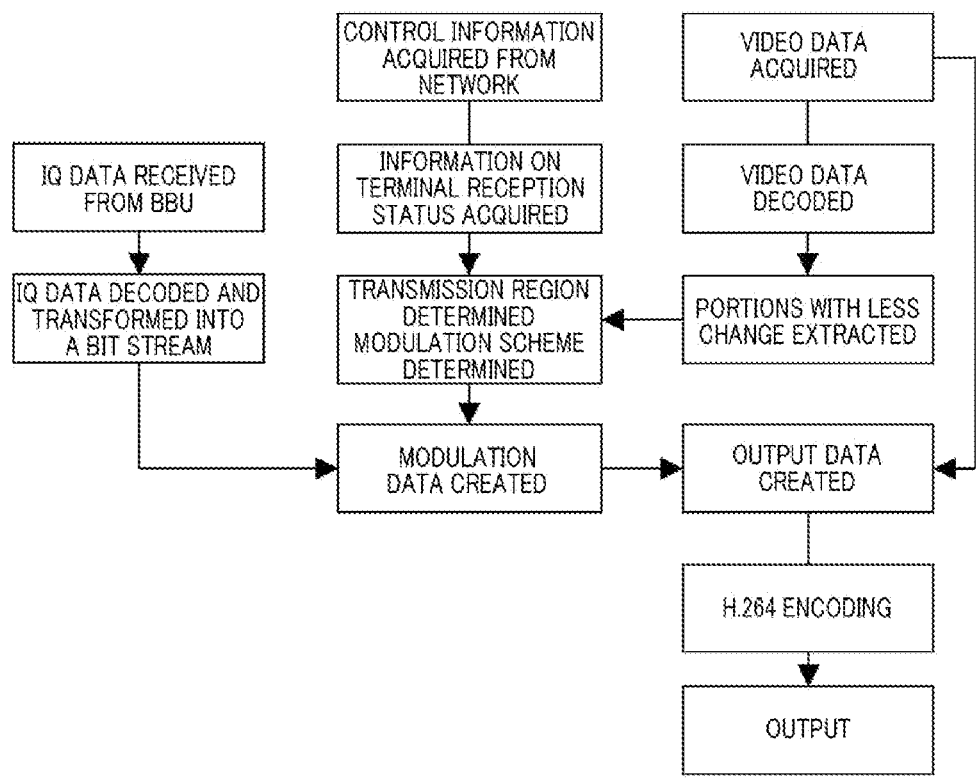
FIG. 26 schematically illustrates a Set Top Box internal operation flowchart (example).

FIG. 26 schematically illustrates a Set Top Box internal operation flowchart (example). The STB 101 receives IQ data from the BBU 103. The STB 101 then decodes the received IQ data and transforms it into a Bit Stream. In addition, the STB 101 acquires control information from the network 50. In addition, the STB 101 acquires information on the terminal reception status. In addition, the STB 101 acquires video data. The STB 101 then decodes the video data. The STB 101 extracts portions with less change within the video data.

The STB 101 then determines a transmission region. In addition, the STB 101 determines the modulation scheme. For determination of the modulation scheme, in case of a video such as a signage, the STB 101 may modulate the brightness in four steps (MCS0 to MCS4). The color information may be of at most three types including RGB. The MCS may be selected from the reception brightness information. The RGB may be selected to match the color of the location at which data is superimposed. In case of a lighting with white color, the STB 101 may modulate the brightness in four steps (MCS0 to MCS4). The color information may be of at most three types including RGB. MCS and RGB may be determined based on the area in which data can be superimposed (PRB) the data amount being buffered. The STB 101 then creates modulation data. The STB 101 creates output data, and executes and causes output of H.264 encoding.

Figure 27:
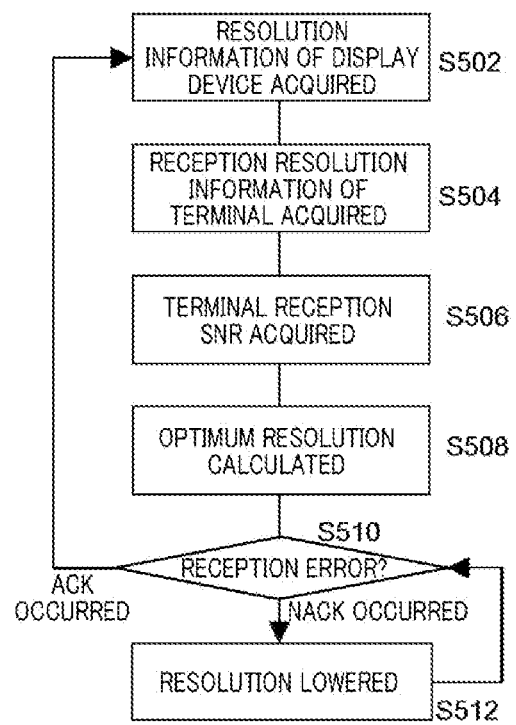
FIG. 27 schematically illustrates a flowchart for transmission resolution determination.

FIG. 27 schematically illustrates a flowchart for transmission resolution determination. The transmission resolution determination may be executed by the STB 101. At S502, the resolution information of the display device 100 is acquired. At S504, the reception resolution information of the communication terminal 200 is acquired. At S506, the terminal reception SNR is acquired. At S508, the optimum resolution is calculated. At S510, it is judged whether a reception error has occurred. At S512, the resolution is lowered.

Figure 28:
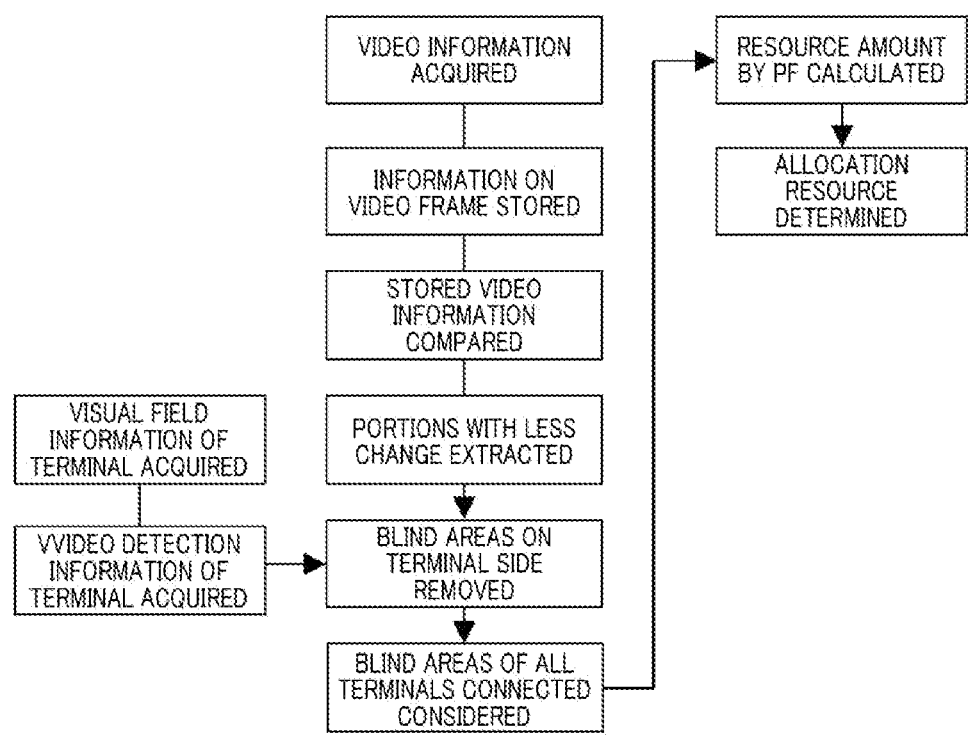
FIG. 28 schematically illustrates a flowchart for data superimposing position determination.

FIG. 28 schematically illustrates a flowchart for data superimposing position determination. The data superimposing position determination may be executed by the STB 101. The STB 101 acquires visual field information of a terminal, and acquires video detection information of the terminal. In addition, the STB 101 acquires the video information, stores the information on the video frames, performs a comparison with stored video information, and extracts portions with less change. The STB 101 removes blind areas of the communication terminal 200 connected thereto. The STB 101 considers blind areas of all of the terminals connected thereto. The STB 101 then calculates the resource amount by the PF, and determines the allocation resource.

Figure 29:
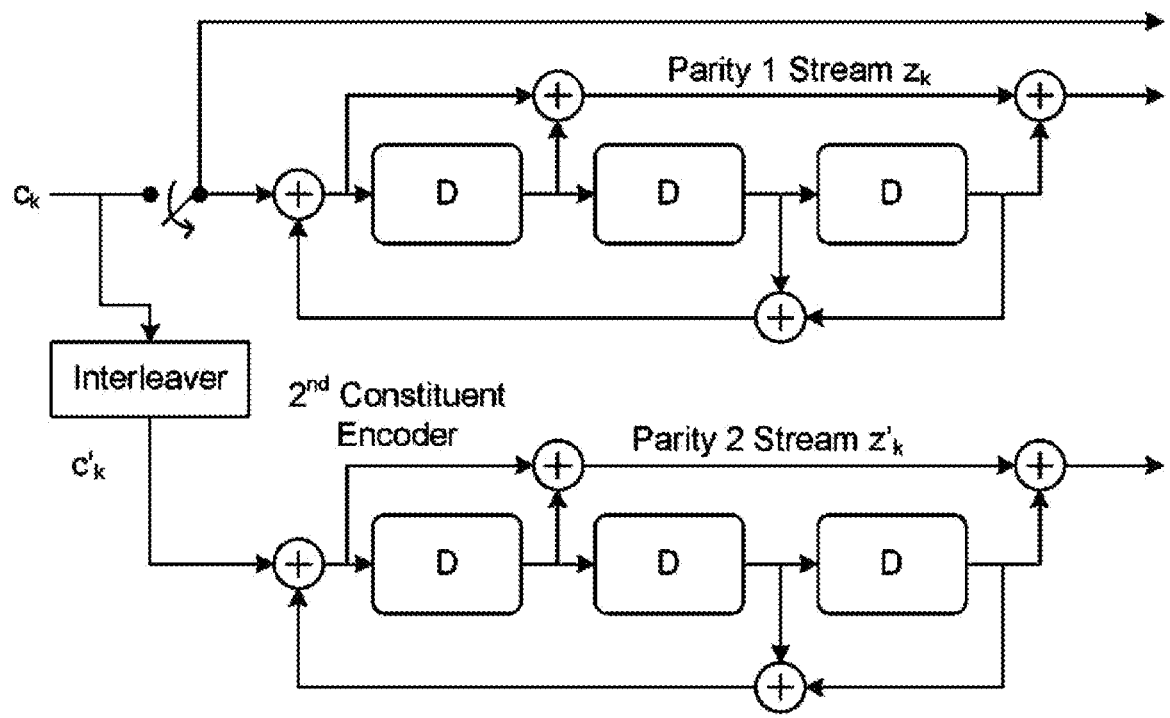
FIG. 29 schematically illustrates an algorithm for data coding.

FIG. 29 schematically illustrates an algorithm for data coding. Here, a turbo code is illustrated as an example, but it is not limited thereto.

Figure 30:
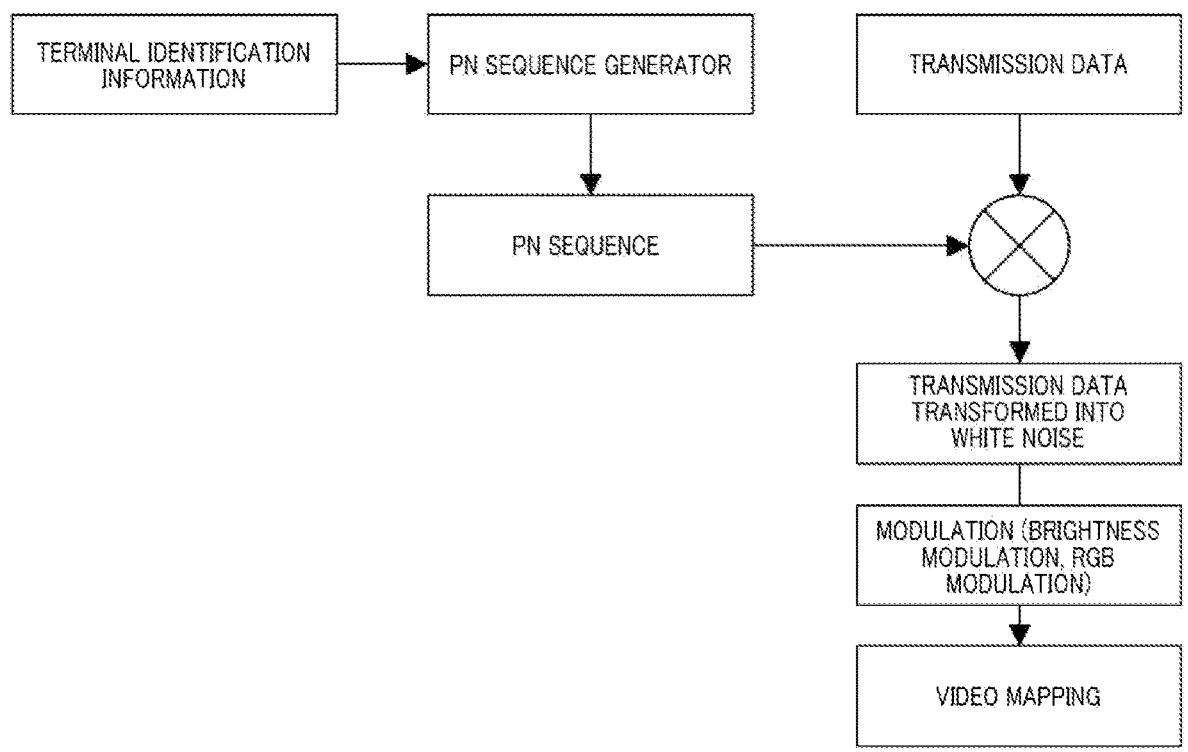
FIG. 30 schematically illustrates n algorithm related to transforming transmission light into white noise.

FIG. 30 schematically illustrates n algorithm related to transforming transmission light into white noise. Transforming transmission light into white noise may be executed by the STB 101. The STB 101 applies terminal identification information to a PN sequence generator to output a PN sequence, and with the PN sequence and the transmission data, generates transmission data transformed into white noise, and performs modulation (brightness modulation, RGB modulation) to execute video mapping.

Figure 31:
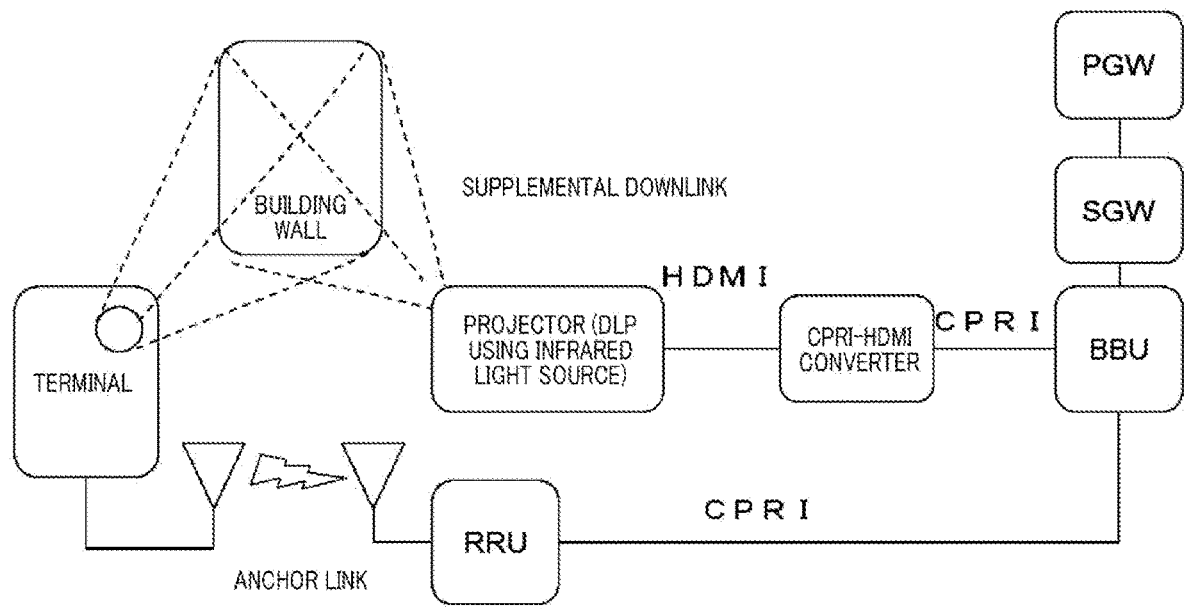
FIG. 31 illustrates a major example 1 (an example of using DLP using an infrared light source).

As shown in FIG. 31: major example 1 (example in which infrared DLP is used), for a projector, DLP (Digital Lite Processing) projector which uses a infrared light source is used to achieve supplemental downlink by projecting a video in which transmission data is encoded, onto a building wall mainly at nighttime. A semiconductor camera having sensitivity in an infrared range is used for the communication terminal, and the camera angle can be changed by adjusting the directionality of the lens by means of a motor drive mechanism for adjustment such that the semiconductor camera can capture, with optical zoom mechanism, the entire video projected onto a building or the like, obtained by encoding the transmission data, thereby optimizing the use of the resolution of the semiconductor camera to achieve supplemental downlink. As another implementation, an implementation in which the entire video projected onto a building wall is enlarged and focused, instead of using a particular video projection region, and the entire video projected is divided to achieve simultaneous communication among a plurality of communication terminals is more efficient.

Figure 32:
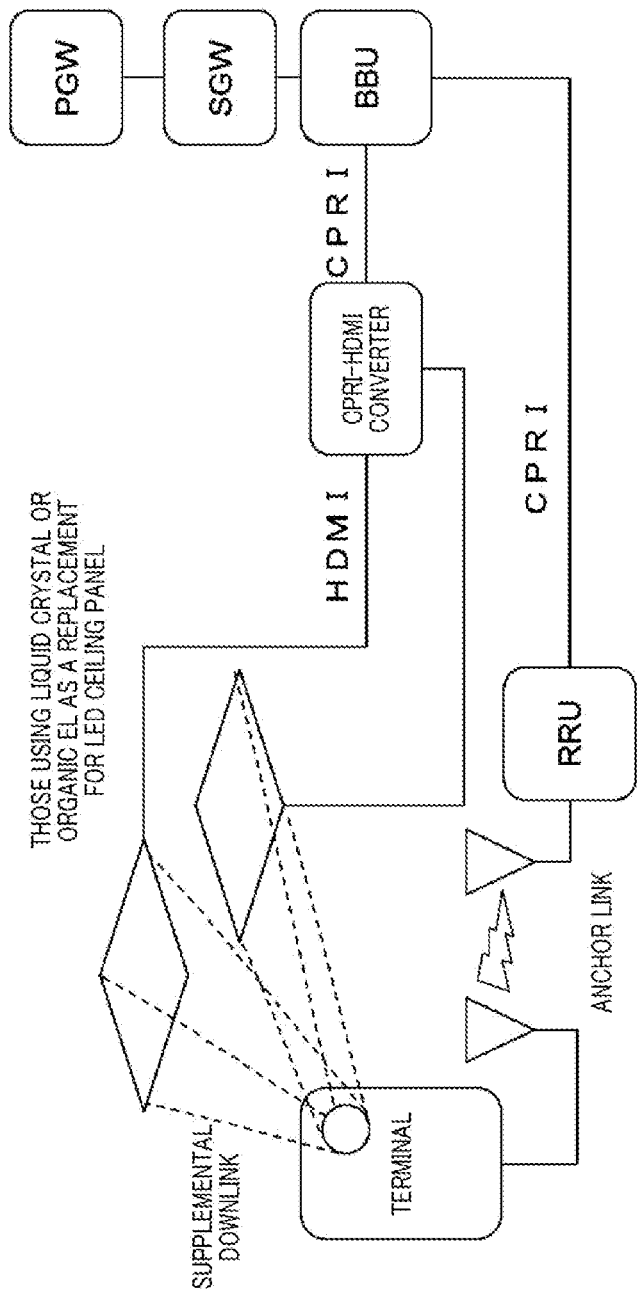
FIG. 32 illustrates a major example 2 (a ceiling lighting at an office).

As shown in FIG. 32: major example 2 (ceiling lighting at an office), supplemental downlink is achieved by replacing a ceiling lighting at an office with a lighting panel according the the present invention (those using liquid crystal or organic EL) and connecting it to the BBU via a CPRI-HDMI converter to use the ceiling lighting as the display device.

Figure 33:
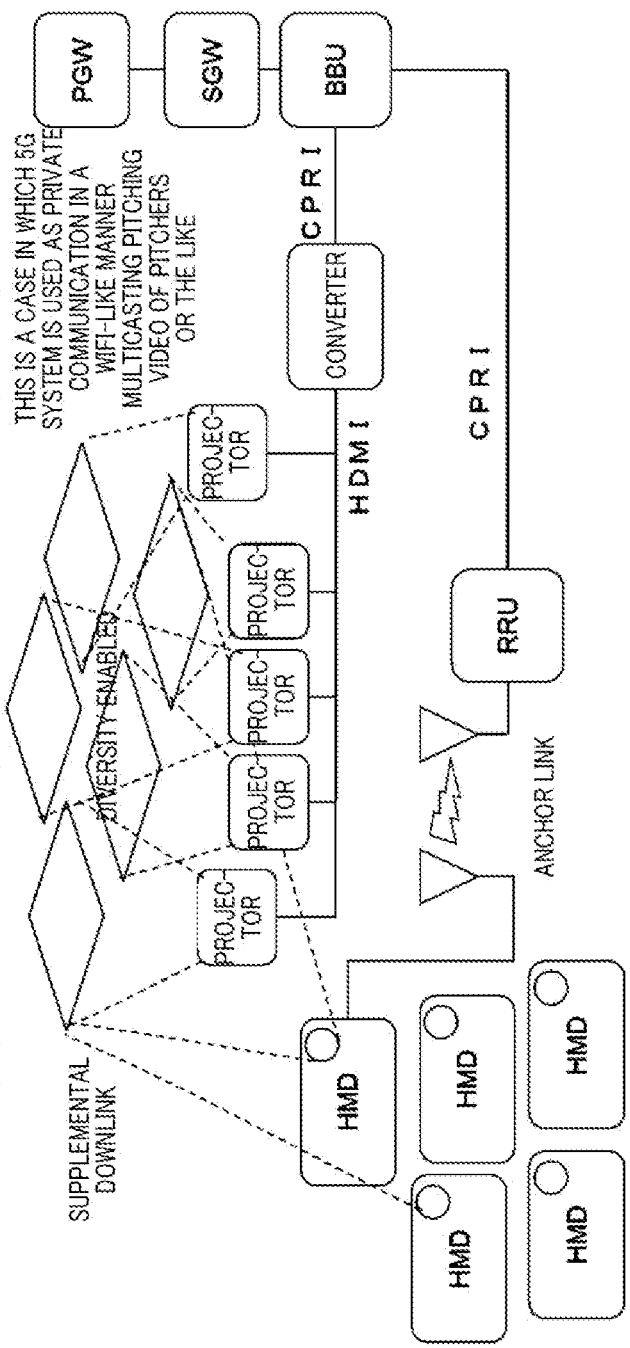
FIG. 33 illustrates a major example 3 (a ceiling of a domed stadium).

As shown in FIG. 33: major example 3 (ceiling of a domed stadium), supplemental downlink is achieved by installing tens of projectors in a domed stadium and projecting a video obtained by encoding the transmission data onto the stadium ceiling to turn the ceiling of the stadium into the video displaying device. In this case, a communication terminal may be embedded in an HMD (Head Mount Display). In addition, the same data can be received by multiple HMDs at the same time by performing multicast communication.

Figure 34:
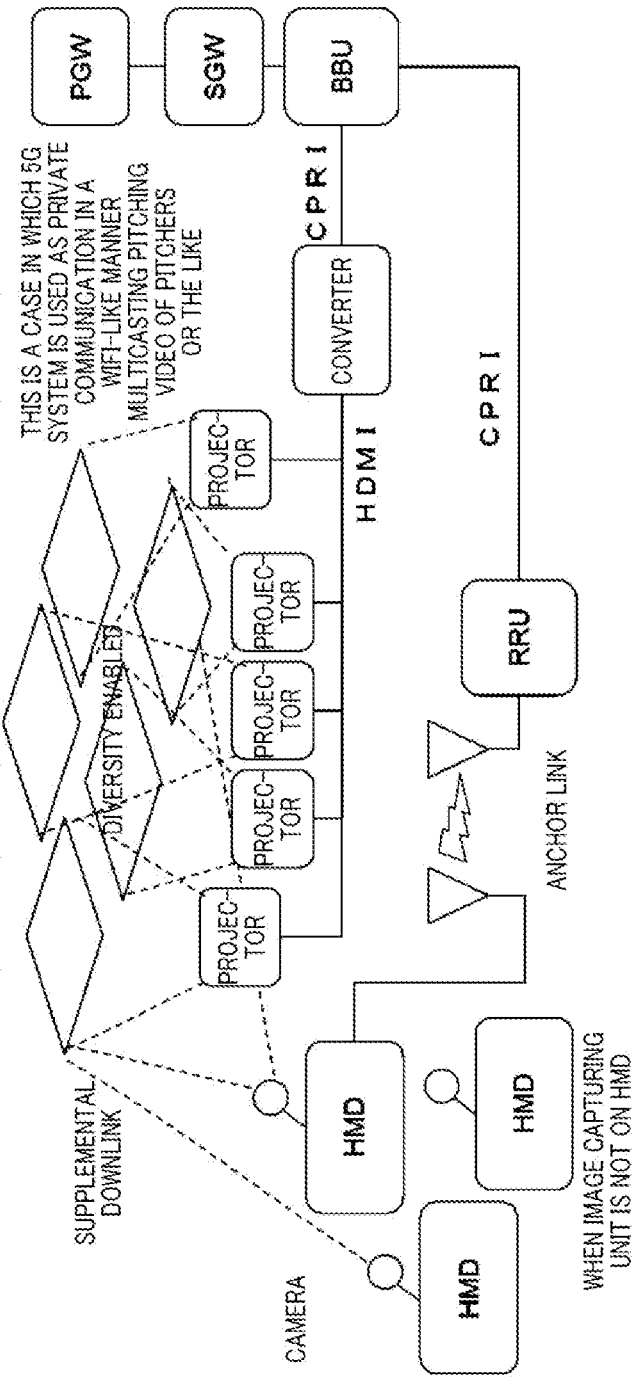
FIG. 34 illustrates a major example 3.1 (a ceiling of a domed stadium).
Figure 35:
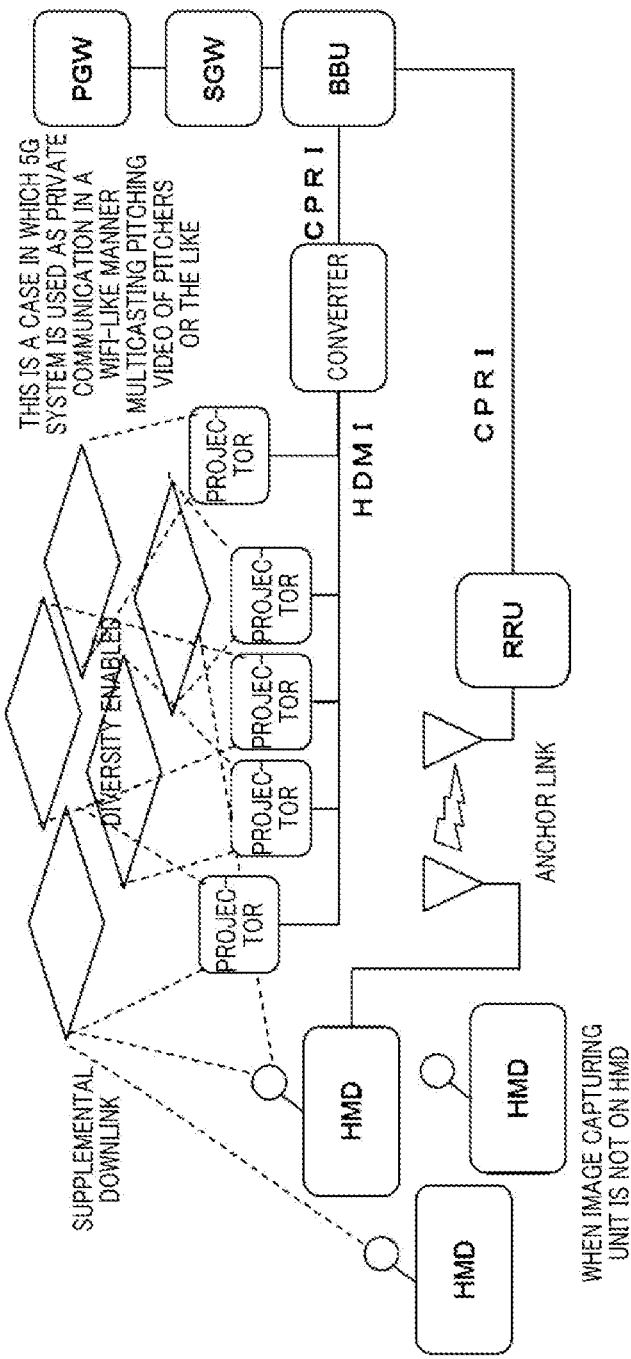
FIG. 35 illustrates a major example 3.1 (a ceiling of a domed stadium).

The video captured by the communication terminal can be made redundant by projecting the same video from multiple projectors, respectively, with a communication system shown in FIG. 34, FIG. 35: major example 3 (a ceiling of a domed stadium). Such diversity effects enable a stable and high-speed communication with lower resending frequency.

Figure 36:
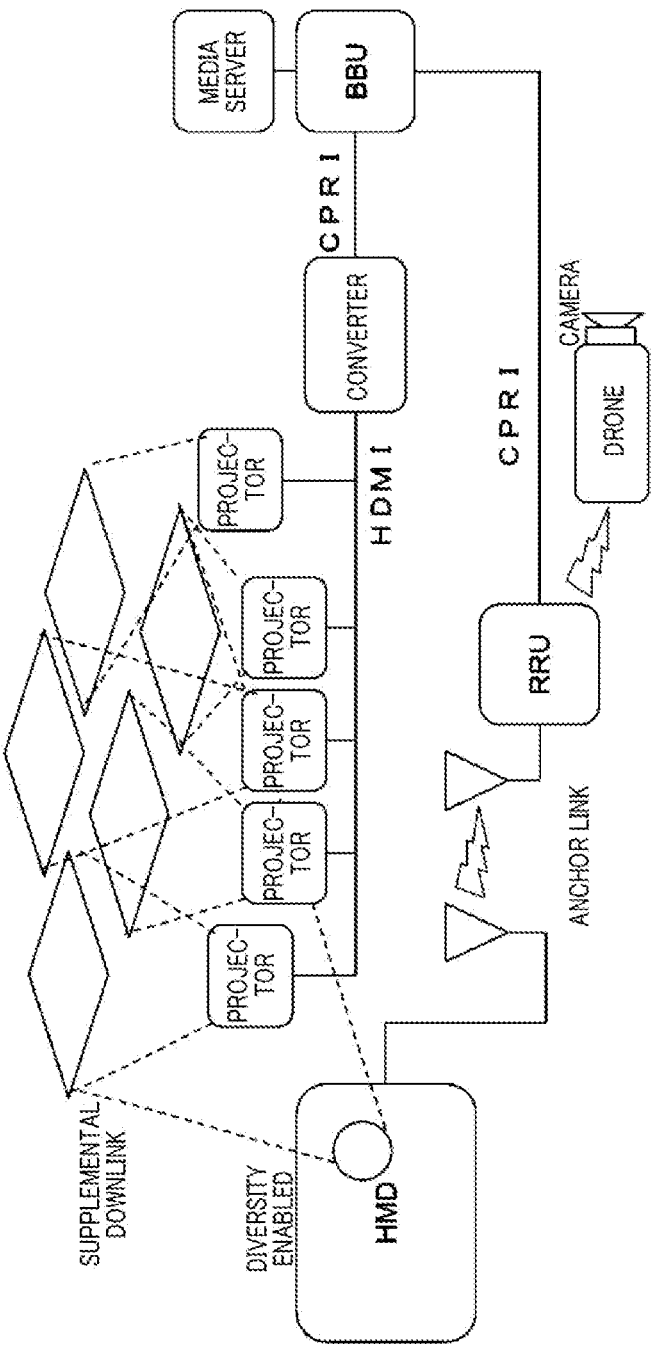
FIG. 36 illustrates a major example 4 (a drone camera of a domed stadium).

During large-scale events such as the Olympics, as shown in FIG. 36: major example 3 (drone camera in a domed stadium), a video transmitted from a drone flying in the stadium is stored in a data server installed in the stadium using communication other than optical communication (such as 4G and 5G or WiFi to perform multicast communication to the communication terminals in the stadium using the communication system of FIG. 33.

Figure 37:
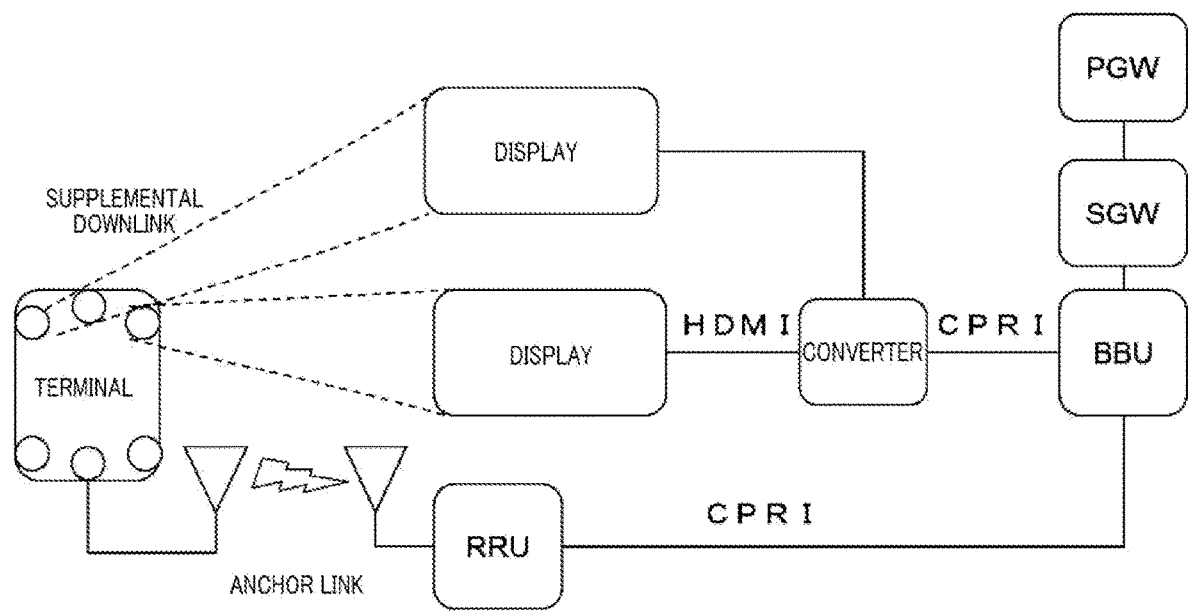
FIG. 37 illustrates a major example 5 (reception with a plurality of cameras).

As shown in FIG. 37: major example 5 (reception at multiple cameras), when the communication terminal has cameras in six directions including the front and back side, upper and lower side, and left and right side, by selecting a camera that is capable of capturing the video displaying device such that the communication rate becomes the highest, supplemental downlink according to the present invention can always be achieved without depending on the posture of the communication terminal.

Figure 38:
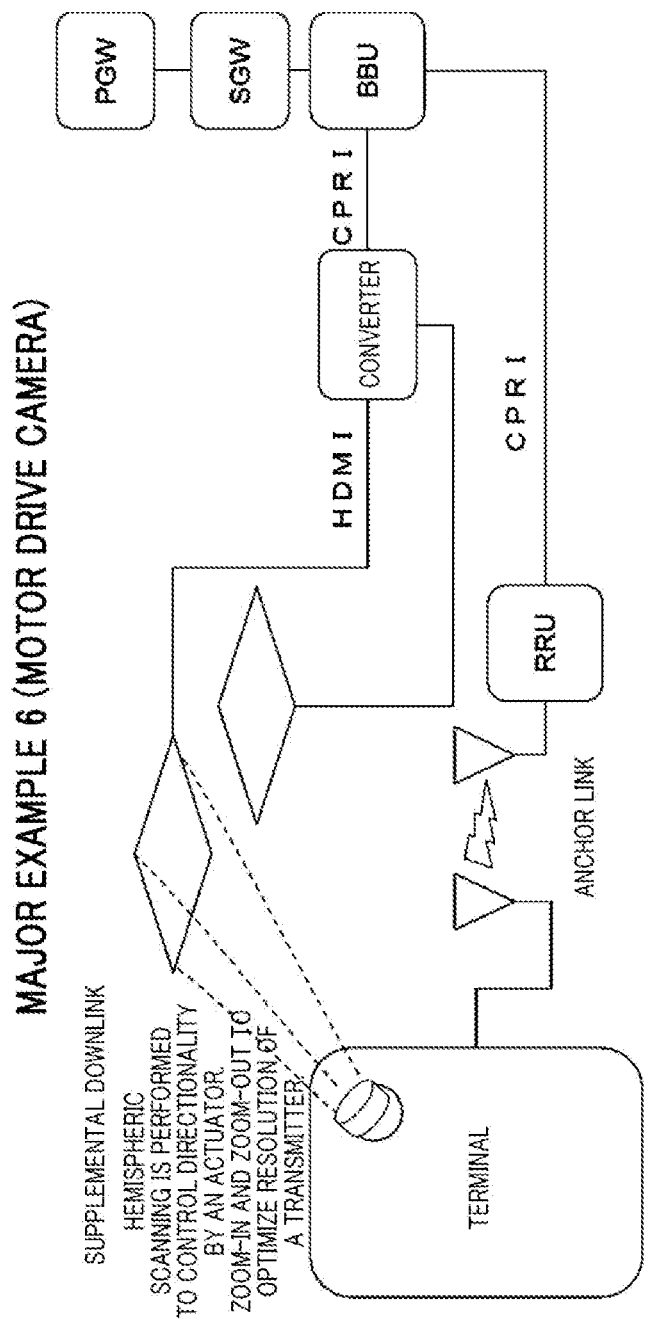
FIG. 38 illustrates a major example 6 (motor drive camera).

As shown in FIG. 38: major example 6 (motor drive camera), when the communication terminal has a mechanism to adjust the lens by means of a three-dimensional actuator, the directionality adjusting unit adjusts the direction of the lens using said mechanism such that the displayed video by the display device and the capturing direction by the image capturing unit are directly opposite, as well as improves the resolution by performing zoom-in and zoom-out to improve the communication rate.

Figure 39:
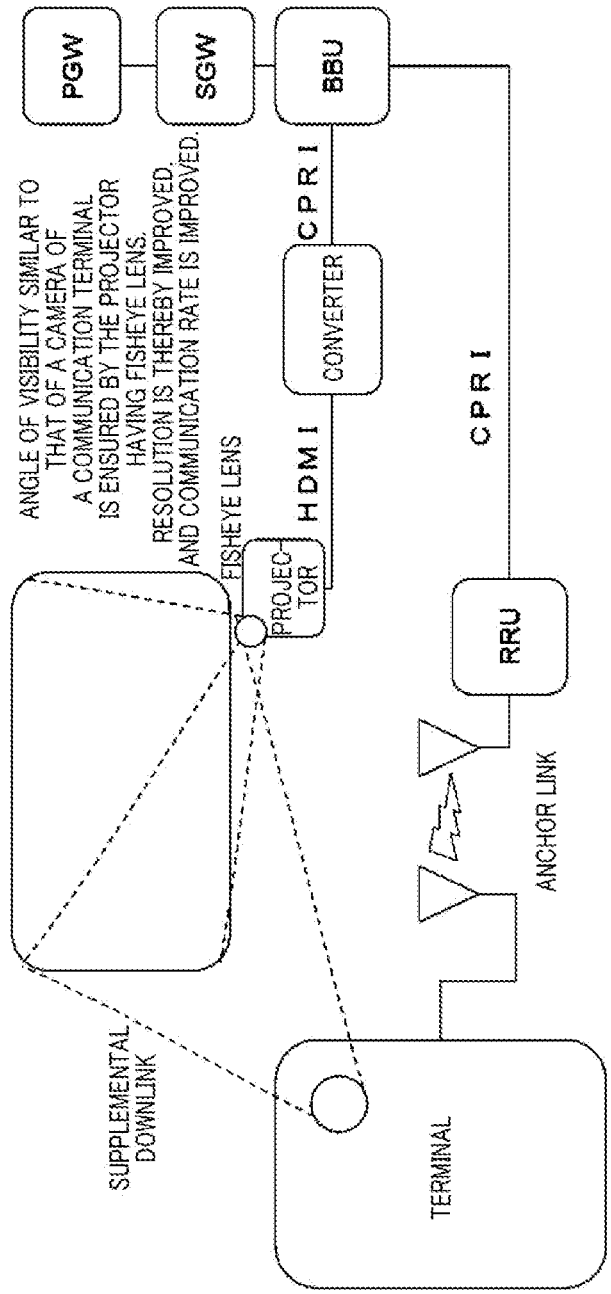
FIG. 39 illustrates a major example 7 (fisheye lens projector).

As shown in FIG. 39: major example 7 (fisheye lens projector), when the projector includes a fisheye lens, a video can be projected in a larger size. In this case, the resolution of the image received by the communication terminal improves, and the communication rate improves.

Figure 40:
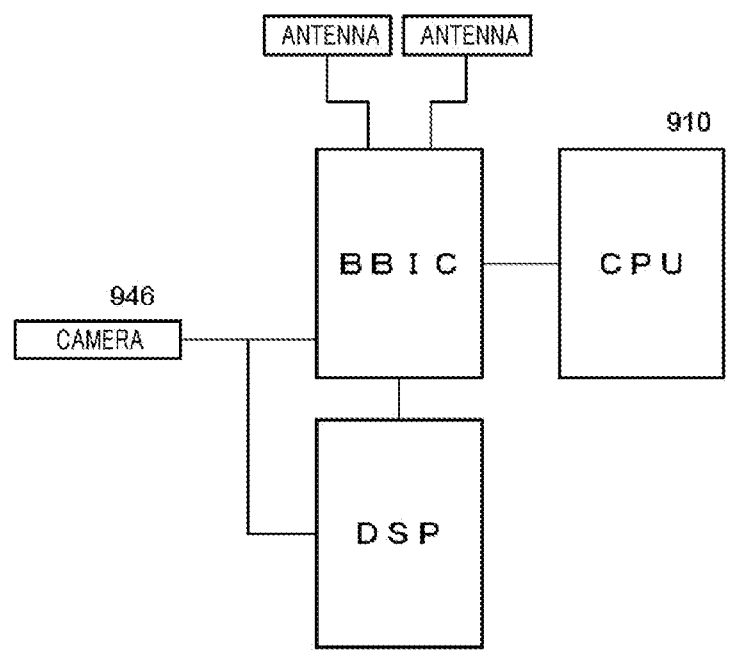
FIG. 40 schematically illustrates an example of a hardware configuration of a computer 900 functioning as the communication terminal 200.

FIG. 40 illustrates an example of a portion related to the present development, among the hardware configuration of a computer 900 functioning as the communication terminal 200. The computer 900 according to the present embodiment includes a CPU 910, a BBIC, a DSP, and a camera 946.

The programs installed onto the computer 900 for causing the computer 900 to function as the communication terminal 200 may instruct the BBIC or the like to cause the computer 900 to function as each unit of the communication terminal 200. Information processings described in these programs are read by the computer 900 to function as the image capturing unit 212, the image processing unit 214, the information communication unit 216, the decoding unit 218, the measuring unit 220, the measurement result transmission unit 222, the position/posture acquiring unit 224, and the directionality adjusting unit 226, which are specific means in which software and the above-described various hardware resources cooperate. These specific means implement operations or processings of information according to the intended use of the computer 900 in the present embodiment, and the communication terminal 200 is thereby constructed to be specific for the intended use.

Communication with dual connectivity is established between a CCD device connected to the CPU 910 with a interface having a rate above USB 3.0 (10 Gbps) and a 5G compatible BBIC (including 3G and 4G) connected to the CPU 910, and the modem side is not the main means but the CCD device connected to the CPU 1010 provides the data path of supplemental downlink A 5G modem decodes a bit stream from the CCD and the CPU 1010 in a similar manner as the AD data stream of 28 GHz or 76 GHz, and transforms it into supplemental downlink.

The information processings written in a program installed onto the STB 101 for causing the display device 100 to function as the optical communication device causes the STB 101 to function as the information reception unit 112, the transmission data acquiring unit 114, the video acquiring unit 116, the region identification unit 118, the video generating unit 120, the display control unit 122, the measurement result reception unit 124, and the brightness level adjusting unit 126.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 communication system; 50 network; 100 display device; 101 STB; 102 computer; 103 BBU; 104 display; 105 projector; 106 converter; 108 projected video; 112 information reception unit; 114 transmission data acquiring unit; 116 video acquiring unit; 118 region identification unit; 120 video generating unit; 122 display control unit; 124 measurement result reception unit; 126 brightness level adjusting unit; 200 communication terminal; 201 CMOS sensor; 202 CPU; 203 display; 204 communication modem; 212 image capturing unit; 214 image processing unit; 216 information communication unit; 218 decoding unit; 220 measuring unit; 222 measurement result transmission unit; 224 position/posture acquiring unit; 226 directionality adjusting unit; 300 management device; 400 identified region; 402 divided region; 404 divided region; 410 synchronization signal; 420 call signal; 430 anchor signal; 432 anchor signal; 434 anchor signal; 440 identified region; 442 divided region; 510 building; 520 building; 600 obstacle; 810 status; 820 status; 900 computer; 910 CPU; 946 camera

What is claimed is:

1. A display control device comprising:
   at least one processor;
   a video acquiring section of the at least one processor, when executed by the at least one processor, configured to acquire a video to be displayed;
   a region identification section of the at least one processor, when executed by the at least one processor, configured to identify, within the video acquired by the video acquiring section, a region in which there is no change or an amount of change is lower than a predetermined threshold;
   a video generating section of the at least one processor, when executed by the at least one processor, configured to:
      (i) apply terminal identification information to a PN sequence generator to output a PN sequence,
      (ii) with the PN sequence and transmission data, generate transmission data transformed into white noise,
      (iii) perform brightness modulation or RGB modulation,
      (iv) generate an encoded video obtained by encoding, as an optical communication signal, the transmission data into an identified region, and
      (v) further generate the encoded video obtained by encoding terminal identification information into a region other than the identified region into which the transmission data is encoded; and
   a display control section of the at least one processor, when executed by the at least one processor, configured to cause a display to display the encoded video, and to display unique terminal identification information of one of a plurality of communication terminals in a terminal identification signal, the terminal identification information uniquely identifying each of the plurality of communication terminals, to enable a unicast service.

2. A communication terminal having a function to perform, using successive interference cancellation technology, interference cancellation on a signal of a display control device other than the display control device according to claim 1 to be a unicast communication partner that is displayed in an image captured by an image capturing unit, based on the terminal identification signal.

3. The display control device according to claim 1, further comprising:
   a scrambling code generation section of the at least one processor, when executed by the at least one processor, configured to provide interference cancellation and
   a scrambling section of the at least one processor, when executed by the at least one processor, configured to scramble transmission data using scrambling code generated by the scrambling code generation section, and having a function to transmit scrambling code information to one of the plurality of communication terminals as the terminal identification signal.

4. The display control device according to claim 1, further comprising:
   an interference cancellation section of the at least one processor to individually generate a spread spectrum code for each of the plurality of communication terminals, and
   a section of the at least one processor to perform spectrum spreading of a displayed video using the spread spectrum code.

5. A non-transitory computer-readable storage medium having stored thereon a program which when executed causes a computer to function as a display control device by:
   acquiring a video to be displayed;
   identifying, within the video acquired by the acquired video, a region in which there is no change or an amount of change is lower than a predetermined threshold;
   applying terminal identification information to a PN sequence generator to output a PN sequence;

with the PN sequence and transmission data, generating transmission data transformed into white noise;

performing brightness modulation or RGB modulation;

generating an encoded video obtained by encoding, as an optical communication signal, the transmission data into the identified region;

generating an encoded video obtained by encoding terminal identification information into a region other than the identified region (into which the transmission data is encoded); and causing a display to display the encoded video, and to display unique terminal identification information of one of a plurality of communication terminals in a terminal identification signal, the terminal identification information uniquely identifying each of the plurality of communication terminals, to enable a unicast service.

\* \* \* \* \*